United States Patent
Fukui et al.

[19]

[11] Patent Number: 6,028,630
[45] Date of Patent: Feb. 22, 2000

[54] DRIVING CONTROL METHOD FOR IMAGING ELEMENT, IMAGING CONTROL METHOD, IMAGING CONTROL DEVICE, IMAGING SYSTEM AND IMAGING DEVICE

[75] Inventors: Hiroshi Fukui; Kikue Shimokawa, both of Kanagawa, Japan

[73] Assignee: Sony Corporation, Tokyo, Japan

[21] Appl. No.: 09/108,257

[22] Filed: Jul. 1, 1998

Related U.S. Application Data

[63] Continuation of application No. PCT/JP97/04027, Nov. 5, 1997.

[30] Foreign Application Priority Data

Nov. 5, 1996 [JP] Japan ..................................... 8-293030
Nov. 5, 1996 [JP] Japan ..................................... 8-293031
Nov. 5, 1997 [WO] WIPO ....................... PCT/JP97/04027

[51] Int. Cl.[7] ..................................................... H04N 5/335
[52] U.S. Cl. .......................... 348/312; 348/314; 348/322
[58] Field of Search ................................... 348/239, 294, 348/295, 296, 297, 298, 299, 311, 320, 321, 322, 323, 61, 143, 157, 180, 312, 314; H04N 5/335

[56] References Cited

U.S. PATENT DOCUMENTS

| | | |
|---|---|---|
| 4,984,002 | 1/1991 | Kokubo . |
| 5,157,502 | 10/1992 | Nakajima et al. . |
| 5,243,432 | 9/1993 | An .......................................... 348/296 |
| 5,422,670 | 6/1995 | Fukui . |
| 5,576,762 | 11/1996 | Udagawa ................................ 348/296 |

FOREIGN PATENT DOCUMENTS

| | | |
|---|---|---|
| 64-025682 | 1/1989 | Japan . |
| 4-355578 | 12/1992 | Japan . |
| 6-319083 | 11/1994 | Japan . |
| 7-212657 | 8/1995 | Japan . |

*Primary Examiner*—Tuan Ho
*Attorney, Agent, or Firm*—Frommer Lawrence & Haug, LLP.; William S. Frommer

[57] ABSTRACT

To image a detection object 302 transferred on a transfer path 301 by an imaging device 310, a trigger signal TRIG is obtained by detecting the detection object 302 by an object sensor 303, and operation of the imaging device 310 is controlled by an imaging control device 320 in response to the trigger signal TRIG. The imaging control device 320 includes a pulse width variable setting section 327 for generating a modulated trigger signal MTRIG which enables variable setting of the pulse width on the basis of the trigger signal TRIG, a synchronizing signal generator 323 for generating a standard vertical synchronizing signal VD and a standard horizontal synchronizing signal HD in conformity to the standard television system, a sub-synchronizing signal generator 324 for generating a sub-vertical synchronizing signal EXT-VD which provides a second timing based on a first timing as the timing of the leading edge of the modulated trigger signal MTRIG, and a high-speed horizontal synchronizing signal generator 325 for generating a high-speed horizontal synchronizing signal Hi-HD having a higher frequency than the standard horizontal synchronizing signal HD over a first period.

24 Claims, 31 Drawing Sheets

FIG.5A (Prior Art) TRIG

FIG.5B (Prior Art) VIDEO

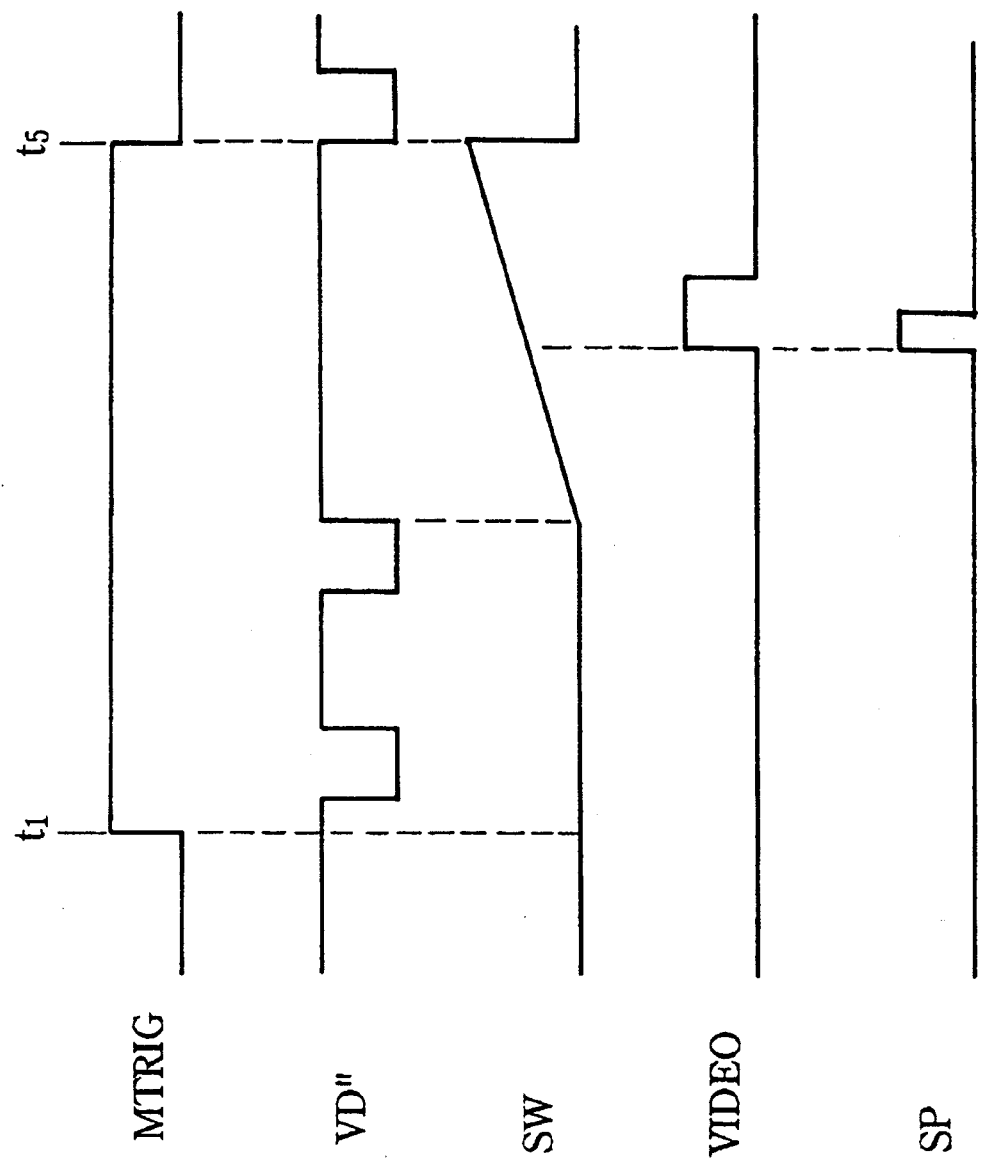

DRIVING CONTROL METHOD FOR IMAGING ELEMENT, IMAGING CONTROL METHOD, IMAGING CONTROL DEVICE, IMAGING SYSTEM AND IMAGING DEVICE

This is a continuation of copending International Application PCT/JP97/04027 having an international filing date of Nov. 5, 1997.

TECHNICAL FIELD

This invention relates to a driving control method for an imaging element, an imaging control method, an imaging control device, an imaging system and an imaging device which are suitable for imaging an object moving at a high speed.

BACKGROUND ART

The present applicant has proposed an imaging device which has an electronic shutter function to adjust the exposure time without using a mechanical iris, by controlling the effective charge storage time of an interline transfer (IT) type solid-state imaging element (CCD image sensor), in the U.S. Pat. No. 5,157,502.

In this imaging device, electric charges stored in each pixel of a photoelectric converter of the CCD image sensor are read out to a vertical transfer section by a sensor gate signal SG shown in FIG. 1B which is outputted in a vertical interval time code VBLK during which a vertical interval signal VB shown in FIG. 1A falls to a low level. The charge storage time of the CCD image sensor is controlled by a reset signal RT shown in FIG. 1C. When this reset signal RT is supplied to the CCD image sensor, it sweeps the electric charges stored in the pixels to an overflow drain.

Therefore, in a period (charge sweep period TI) during which the reset signal RT is supplied every one horizontal period (1H), the effective charges are not stored in the CCD image sensor. Thus, the effective charges are stored in the photoelectric converter of the CCD image sensor from when the reset signal RT supplied to the CCD image sensor is stopped. By controlling the timing to stop the reset signal RT, the effective charge storage time TE, that is, the shutter speed, may be controlled.

In the above-described imaging device, the shutter speed may be varied in response to the movement of an object by using such electronic shutter function. Therefore, the imaging device is advantageous particularly for intake of an image with respect to a high-speed moving object.

As an imaging device for factory automation (FA), for example, an imaging device having a structure as shown in FIG. 2 for imaging a moving object is known. In this imaging device, when an object 2 moving on a moving path 1 moves toward an imaging section 3, an object detector 4 detects the object 2 and supplies a trigger signal TRIG which falls to a low level at a timing t11 shown in FIG. 3A to a shutter signal generating circuit 5 and a synchronizing signal generating circuit 8.

When the trigger signal TRIG is supplied to the shutter signal generating circuit 5, it supplies a shutter control signal STC which rises at the fall timing t11 of the trigger signal TRIG, as shown in FIG. 3B, to a CCD control circuit 6.

The CCD control circuit 6 supplies a reset signal RT for sweeping electric charges stored in a photoelectric converter of the CCD image sensor 7. When the trigger signal TRIG is supplied, the CCD control circuit 6 stops supplying the reset signal RT to the CCD image sensor 7. Thus, storage of effective charges into each pixel of the photoelectric converter of the CCD image sensor 7 is started.

The CCD control circuit 6 is supplied with a vertical synchronizing signal VD which is at a low level during the period from the timing t11 to a timing 12, as shown in FIG. 3C, and a horizontal synchronizing signal HD from the synchronizing signal generating circuit 8. When the shutter control signal STC is supplied to the CCD control circuit 6, it counts nine pulses of horizontal synchronizing signal HD shown in FIG. 3D from the fall timing t11 of the vertical synchronizing signal VD shown in FIG. 3C. After that, the CCD control circuit 6 counts a predetermined number of master clocks, and then supplies a sensor gate signal SG which rises at a timing t13 shown in FIG. 3E to the CCD image sensor 7.

Thus, during the period from when the shutter control signal STC rising at the timing t11 shown in FIG. 3B is supplied to the CCD image sensor 7 until the sensor gate signal SG rising at the timing t13 shown in FIG. 3E is supplied to the CCD image sensor 7, electric charges corresponding to an imaging light radiated through an imaging lens 9 are stored in the CCD image sensor 7. The period from the timing t11 to the timing t13 becomes an effective charge storage time TE.

FIG. 3F shows a vertical interval time code VBLK.

The electric charges read out from the CCD image sensor 7 are supplied as an imaging signal to a signal processing circuit 10. The signal processing circuit 10 performs signal processing, such as, appending a synchronizing signal to the imaging signal, and outputs the processed signal as a video signal through an output terminal 11. The video signal outputted through the output terminal 11 is supplied to, for example, a monitor. Thus, the state of the object 2 in the case where the object 2 is moved may be analyzed.

In this manner, in this imaging device, the vertical synchronizing signal VD is generated and storage of effective charges is started in response to the trigger signal TRIG supplied from the object detector 4, thereby imaging the moving object 2.

Meanwhile, since the imaging device for imaging a moving object is used mainly for FA, there is a case where it is intended to move the object 2 shown in FIG. 2 at a high speed so as to carry out imaging by a high-speed shutter of $\frac{1}{10000}$ seconds, for example.

In the above-described imaging device, however, the output timing of the sensor gate signal SG is preset and fixed on the basis of the pixel array of the CCD image sensor. For example, the sensor gate signal SG is supplied to the CCD image sensor at the timing when a predetermined number of clocks are counted after nine pulses of the horizontal synchronizing signal HD are counted from the fall of the vertical synchronizing signal VD. Therefore, in the imaging device which performs imaging operation by generating the vertical synchronizing signal VD from the trigger signal TRIG, the effective charge storage time cannot be reduced to not longer than the time period from the fall timing of the vertical synchronizing signal VD to the output timing of the sensor gate signal SG. Accordingly, it has been difficult to carry out imaging by a high-speed shutter of $\frac{1}{10000}$ seconds.

On the other hand, there is another case where it is intended to carry out image processing of a video signal from the imaging device by using an image processing equipment. In general, the image processing equipment operates with reference to a predetermined synchronizing signal. Therefore, in the case where video signals from plural imaging devices and video recording/reproducing devices are to be compounded, video signals synchronized with a synchronizing signal as a reference need to be supplied to the image processing equipment.

In the imaging device in such case, if a trigger signal TRIG is supplied at an arbitrary timing as shown in FIG. 4A, after a predetermined effective charge storage time, that is, after a predetermined exposure time, a sensor gate signal SG shown in FIG. 4B is supplied to the CCD image sensor and electric charges stored in each pixel of the photoelectric converter are read out to the vertical transfer section. At the same time, a vertical synchronizing signal V-SYNC is generated so that the electric charges read out to the vertical transfer section are outputted as an imaging signal VIDEO through a horizontal transfer section in synchronization with the generated vertical synchronizing signal V-SYNC, as shown in FIG. 4C. In this imaging device, the video signal VIDEO is outputted at a random interval as shown in FIG. 5B in response to the trigger signal TRIG supplied at an arbitrary timing, that is, randomly, as shown in FIG. 5A. Therefore, the vertical synchronizing signal V-SYNC cannot be outputted in a constant cycle.

Alternatively, in this imaging device, a vertical synchronizing signal V-SYNC of a constant cycle is generated as shown in FIG. 6C. If a trigger signal TRIG shown in FIG. 6A is supplied, after a predetermined exposure time, a sensor gate signal SG shown in FIG. 6B is supplied to the CCD image sensor and electric charges stored in each pixel of the photoelectric converter are read out to the vertical transfer section. At the same time, the vertical synchronizing signal V-SYNC is generated at the timing based on the trigger signal TRIG, unlike the previously generated vertical synchronizing signal V-SYNC.

Meanwhile, with respect to video processing equipments, such as, a frame memory and a monitor, for processing video signals from the imaging device as described above, the operation must be synchronized with the supplied video signals.

However, in these video processing equipments, synchronization with the synchronizing signal of a random cycle is technically very difficult and therefore is not carried out generally.

Thus, it is an object of the present invention to provide a driving control method for an imaging element, an imaging device, an imaging control device and an imaging system which enable performing imaging operation by a high-speed random shutter synchronized with the trigger signal and obtaining effective charges in a predetermined imaging range as an imaging signal.

It is another object of the present invention to provide a driving control method for an imaging element, an imaging device, an imaging control device and an imaging system which enable obtaining an imaging signal in an arbitrary image range.

Also, in such sports fields as track race and swimming race where the speed is important, the goal decision is made with a precision of $1/100$ seconds.

Thus, it is still another object of the present invention to provide an imaging control method, an imaging control device, an imaging system and an imaging device which enable composition of images having a time difference of $1/100$ seconds into one image and output of the composite image.

It is a further object of the present invention to provide an imaging control method, an imaging control device, an imaging system and imaging device which enable imaging of a fast moving object with a predetermined time difference, composition of images into one image, and output thereof.

DISCLOSURE OF THE INVENTION

According to the present invention, a standard vertical synchronizing signal and a standard horizontal synchronizing signal in conformity to the standard television system are generated, and a trigger signal having a cycle not longer than $1/2$ of the cycle of the standard vertical synchronizing signal is generated on the basis of the standard vertical synchronizing signal. At a first timing corresponding to the trigger signal, all electric charges stored in each of light-receiving elements of an interline transfer type solid-state imaging element are eliminated as ineffective charges. At a second timing after a predetermined time from the first timing, electric charges stored in the plural light-receiving elements are read out to a vertical transfer section. During a first period from the second timing to a third timing, the electric charges transferred to the vertical transfer section are vertically transferred at a first transfer speed. During a second period from the third timing to a fourth timing, which is the timing of next trigger signal, the electric charges of the vertical transfer section are vertically transferred at a second transfer speed which is lower than the first transfer speed and corresponding to the standard television system. Thus, the interline transfer type solid-state imaging element is controlled so that one frame of image information is outputted every cycle of the trigger signal through the vertical transfer section. Then, the image information outputted from the interline transfer type solid-state imaging element during plural cycles of the trigger signal is temporarily stored. The stored plural frames of image information are read out as one frame of output image information at a speed based on the standard vertical synchronizing signal and the standard horizontal synchronizing signal. The standard vertical synchronizing signal and the standard horizontal synchronizing signal of the standard television system are appended to the read out one frame of output image information. Thus, it is possible to image a fast moving object with a predetermined time difference and obtain image information compounded into one image. For example, by generating a standard vertical synchronizing signal and a horizontal synchronizing signal in conformity to the CCIR (International Radio Consultative Committee) system, then generating a trigger signal having a cycle $1/2$ of the cycle of the standard vertical synchronizing signal, and performing imaging control of an imaging device of the CCIR system, images having a time difference of $1/100$ seconds may be compounded into one image to be outputted.

Also, according to the present invention, a second trigger signal having a pulse width allowing variable setting by a user is generated on the basis of a first trigger signal. At a second timing based on the first timing, which is the leading edge timing of the second trigger signal, all electric charges stored in plural light-receiving elements of an interline transfer type solid-state imaging element are eliminated as ineffective charges. At a third timing after a predetermined time from the second timing, electric charges stored in the plural light-receiving elements are read out to a vertical transfer section. During a first period from the third timing to a fourth timing, the electric charges transferred to the vertical transfer section are vertically transferred at a first transfer speed. During a second period from the fourth timing to a fifth timing based on the trailing edge of the second trigger signal, the electric charges of the vertical transfer section are vertically transferred at a second transfer speed which is lower than the first transfer speed. Thus, the electric charges supplied to a horizontal transfer section during the second period are outputted as effective charges from the horizontal transfer section. Thus, by utilizing an electronic shutter function of the interline transfer type solid-state imaging element, it is possible to perform imaging operation by a high-speed random shutter synchronized with the first trigger signal, and obtain an imaging signal in an image range determined by the pulse width of the second trigger signal. In addition, by changing the number of lines to be outputted as an imaging signal in accordance with setting of the pulse width of the trigger signal, an imaging signal in an arbitrary image range may be obtained.

BRIEF DESCRIPTION OF THE DRAWINGS

FIG. 34 is a timing chart for explaining the operation of the setting circuit.

BEST MODE FOR CARRYING OUT THE INVENTION

Best modes for carrying out the present invention will now be described in detail with reference to the drawings.

Figure 1:
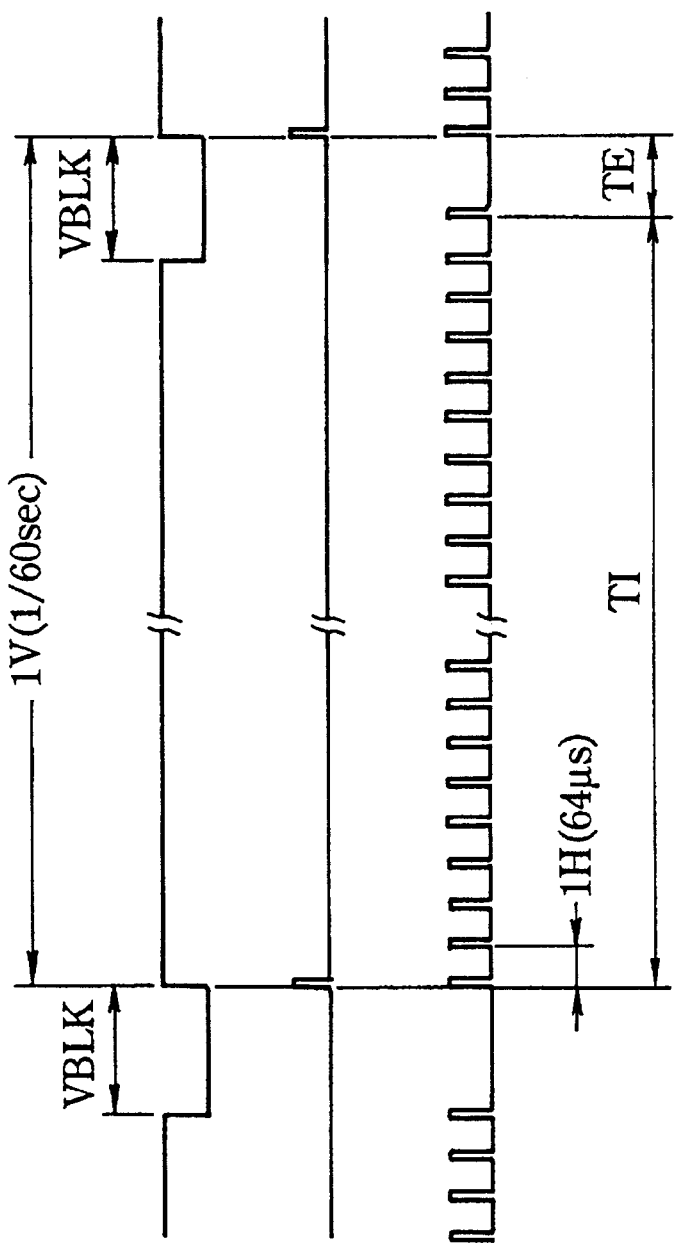
FIG. 1 is a time chart for explaining an electronic shutter function in a conventional imaging device.
Figure 2:
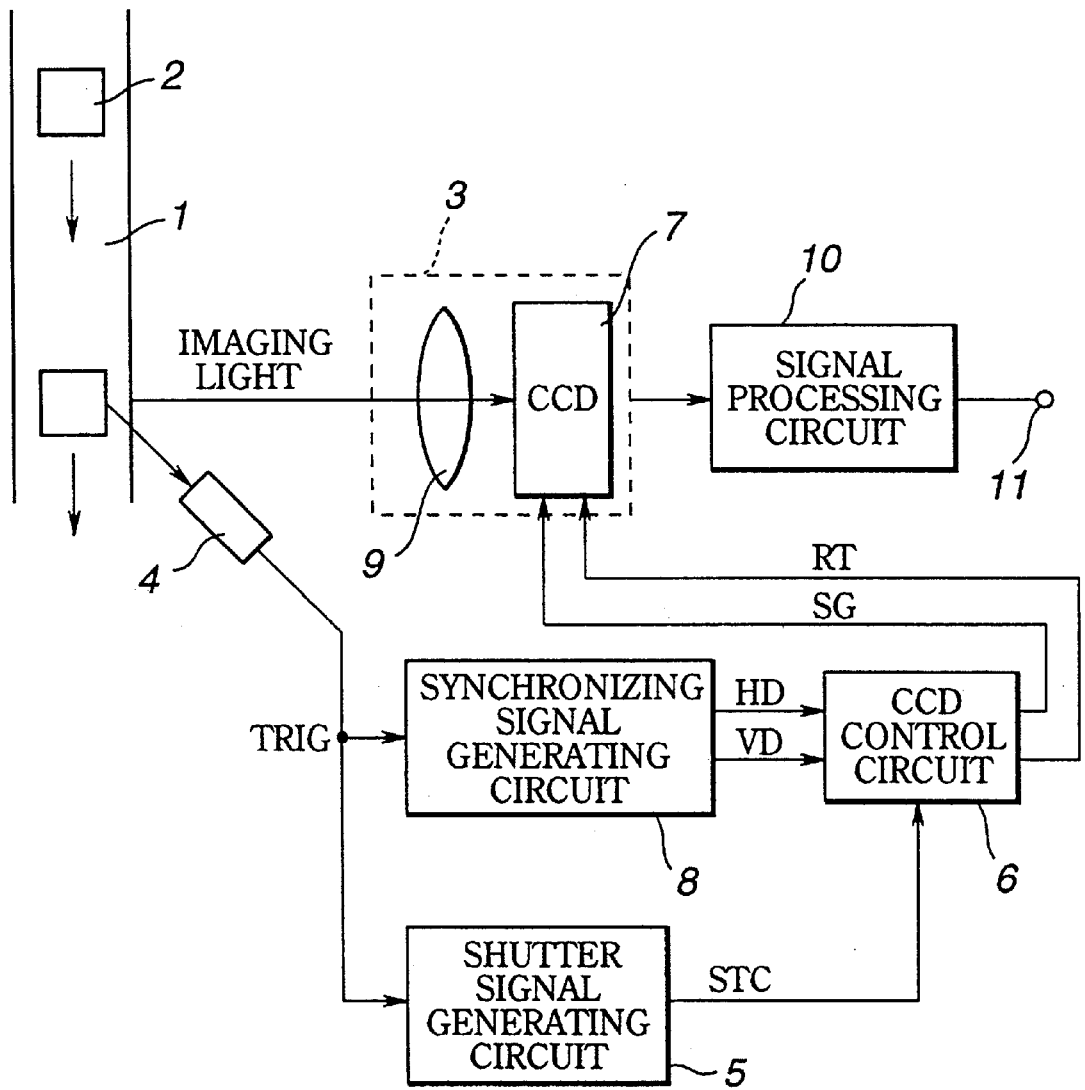
FIG. 2 is a block diagram showing the structure of the conventional imaging device.
Figure 3:
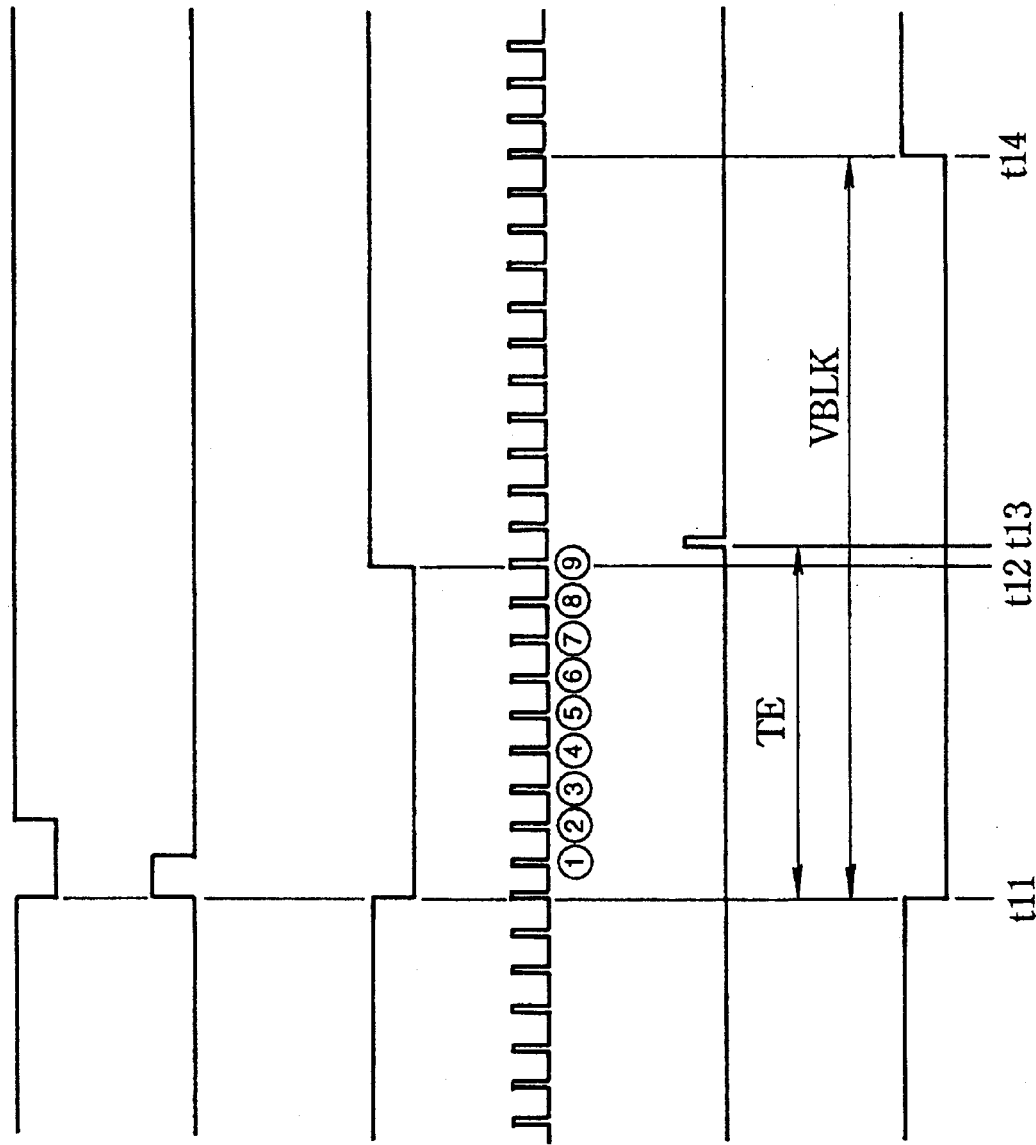
FIG. 3 is a time chart showing an effective charge storage period in imaging operation of the conventional imaging device.
Figure 4:
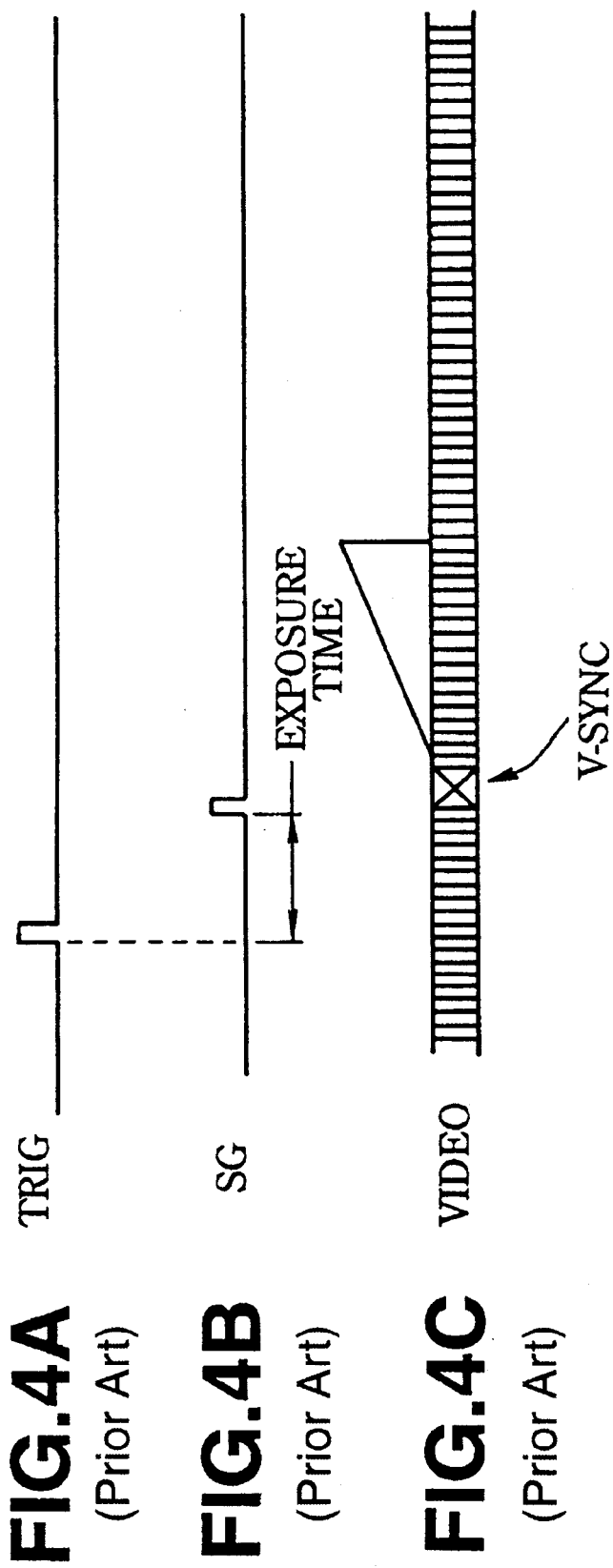
FIG. 4 is a time chart showing imaging operation synchronized with a trigger pulse signal in the conventional imaging device.
Figure 5:
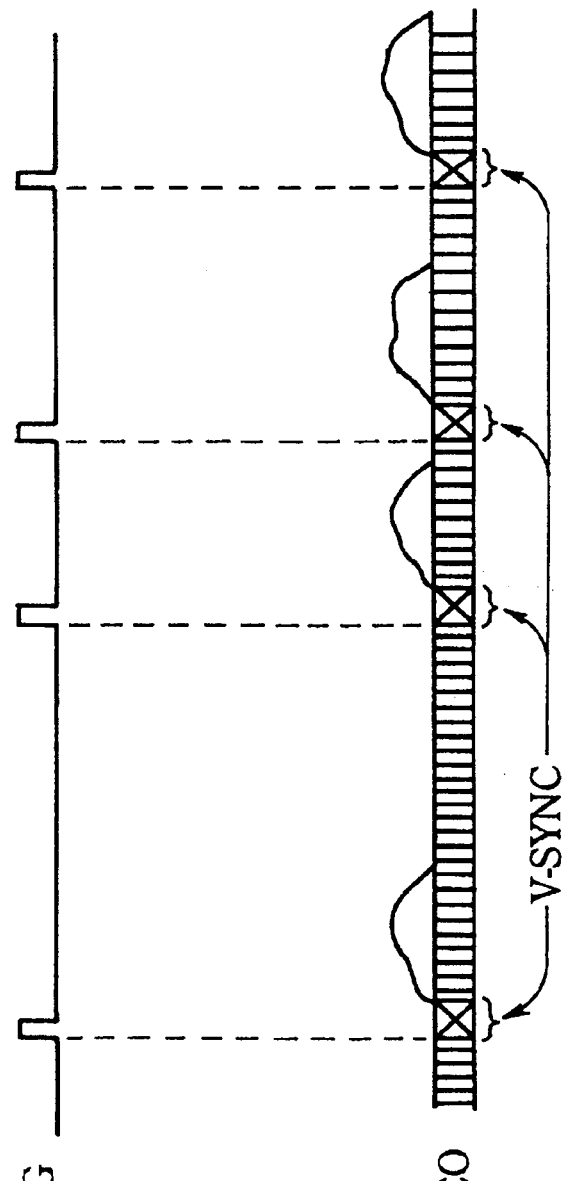
FIG. 5 is a time chart showing imaging operation synchronized with a trigger pulse signal in the conventional imaging device.
Figure 6:
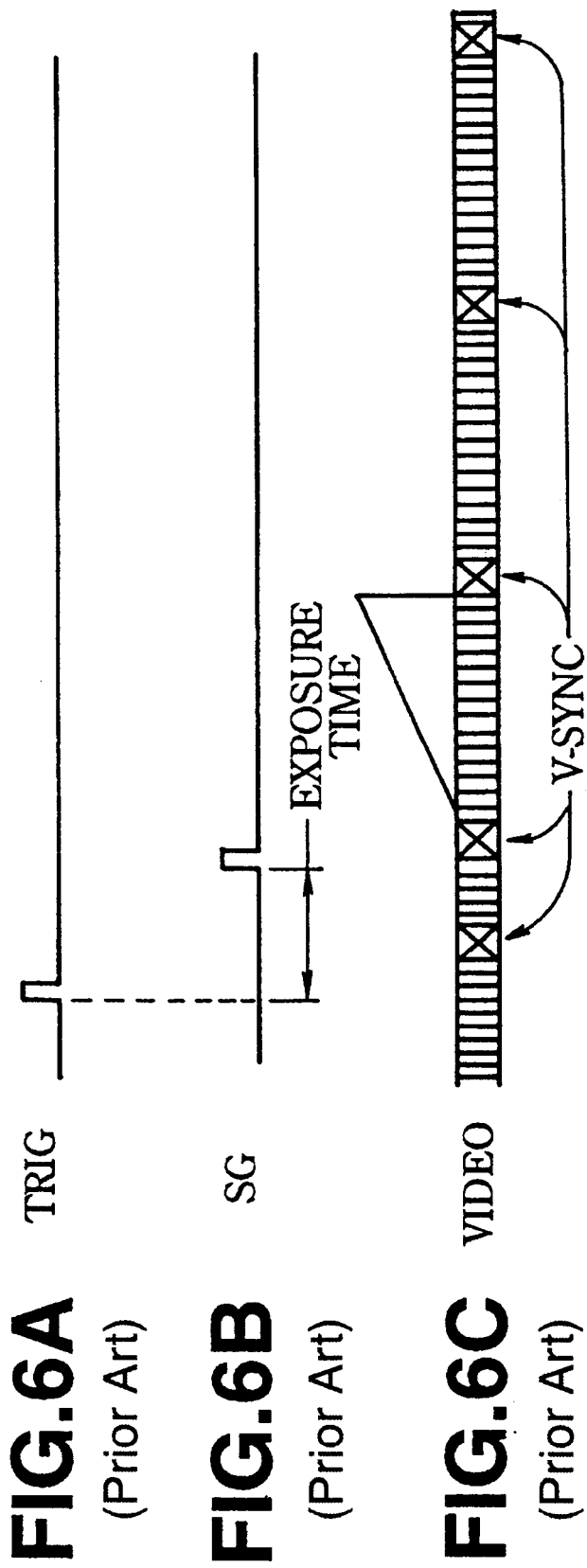
FIG. 6 is a time chart showing imaging operation synchronized with a trigger pulse signal in the conventional imaging device.
Figure 7:
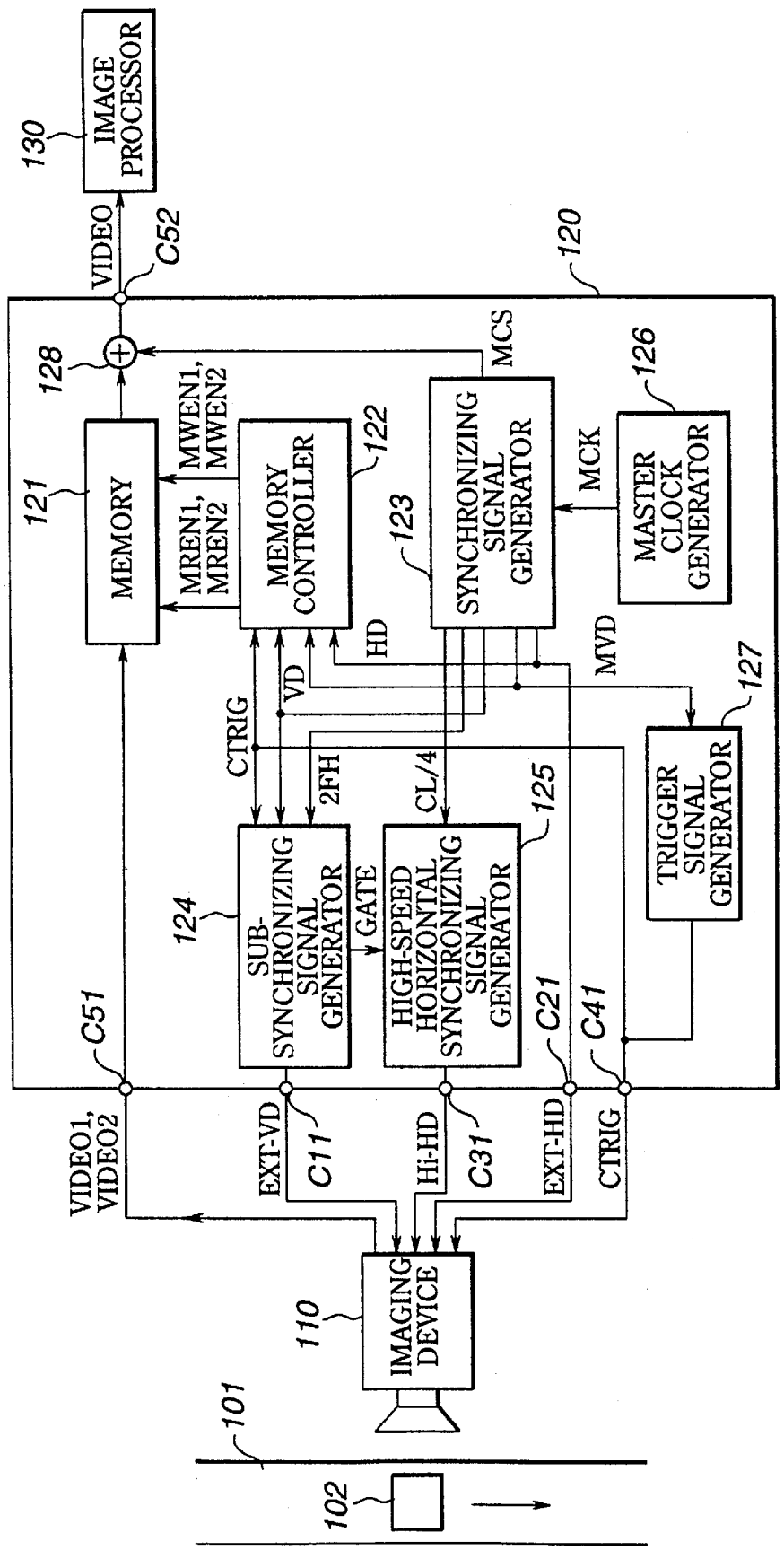
FIG. 7 is a block diagram showing the entire structure of an imaging system according to the present invention.

The present invention is applied to an imaging system having a structure as shown in FIG. 7, for example. This imaging system is adapted for imaging a detection object 102 travelling on a travelling path 101 by an imaging device 110 and taking in the imaged object as a still picture. The imaging system has an imaging control device 120 for controlling the operation of the imaging device 110 and taking a video signal VIDEO from the imaging device 110 as a still picture signal into a memory 121, and an image processor 130 supplied with the video signal VIDEO from the imaging device 110 as the still picture signal through the memory 121.

Figure 8:
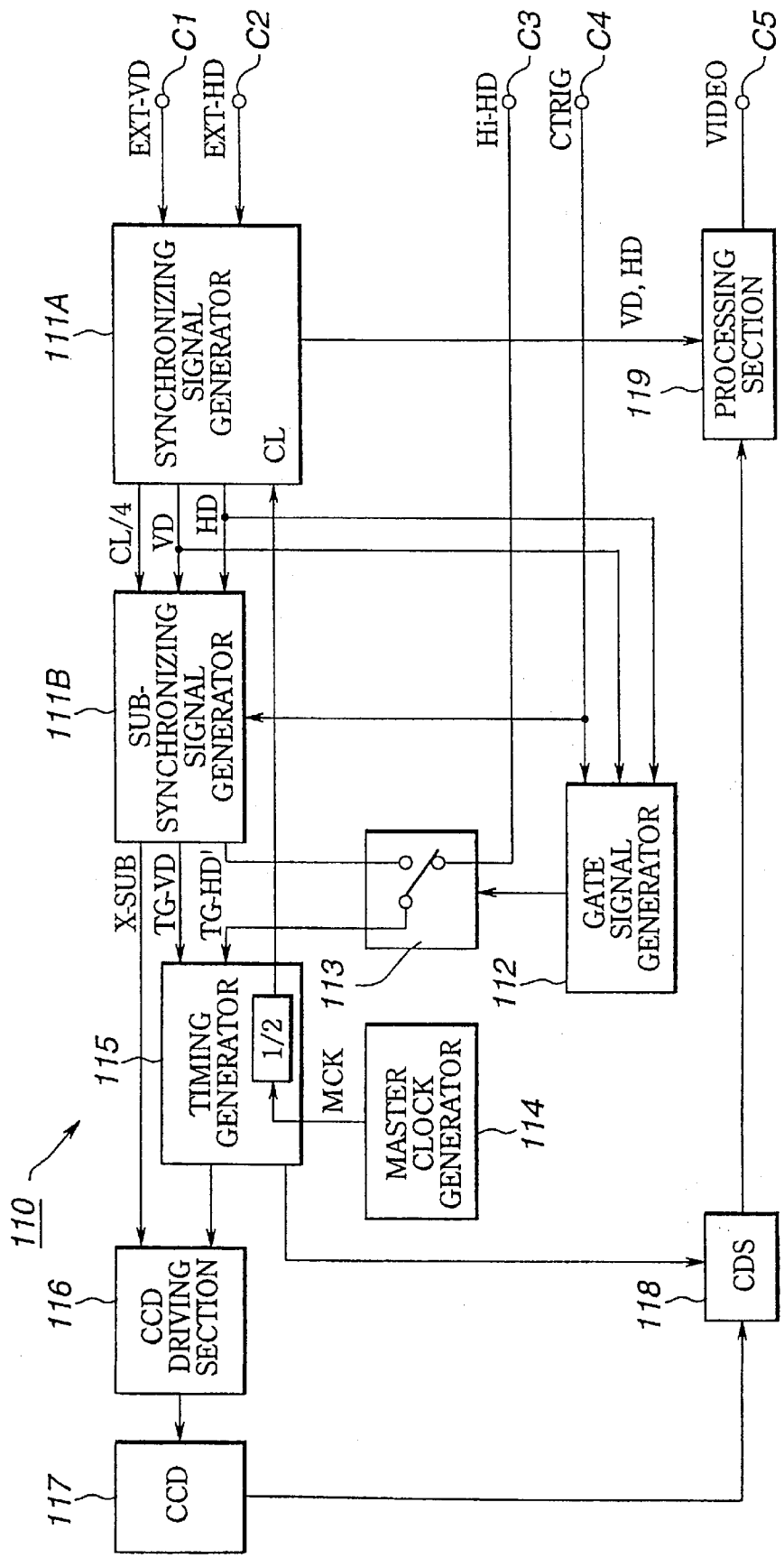
FIG. 8 is a block diagram showing the structure of an imaging device used in the imaging system.

The imaging device 110 includes, as shown in FIG. 8, a synchronizing signal generator 111A supplied with external synchronizing signals EXT-VD, EXT-HD from the imaging control device 120 through terminals C1, C2, a sub-synchronizing signal generator 111B and a gate signal generator 112 which are supplied with a trigger signal CTRIG from the imaging control device 120 through a terminal C4, a switch circuit 113 controlled in switching by a gate signal GATE supplied from the gate signal generator 112, a timing generator 115 caused to operate by a master clock MCK of about 28.6 MHz supplied from a master clock generator 114, a CCD image sensor 117 driven by a CCD driving section 116 operating in response to various timing signals supplied from the timing generator 115, and a processing section 119 supplied with an imaging signal from the CCD image sensor 117 through a correlated double sampling (CDS) circuit 118.

Figure 9:
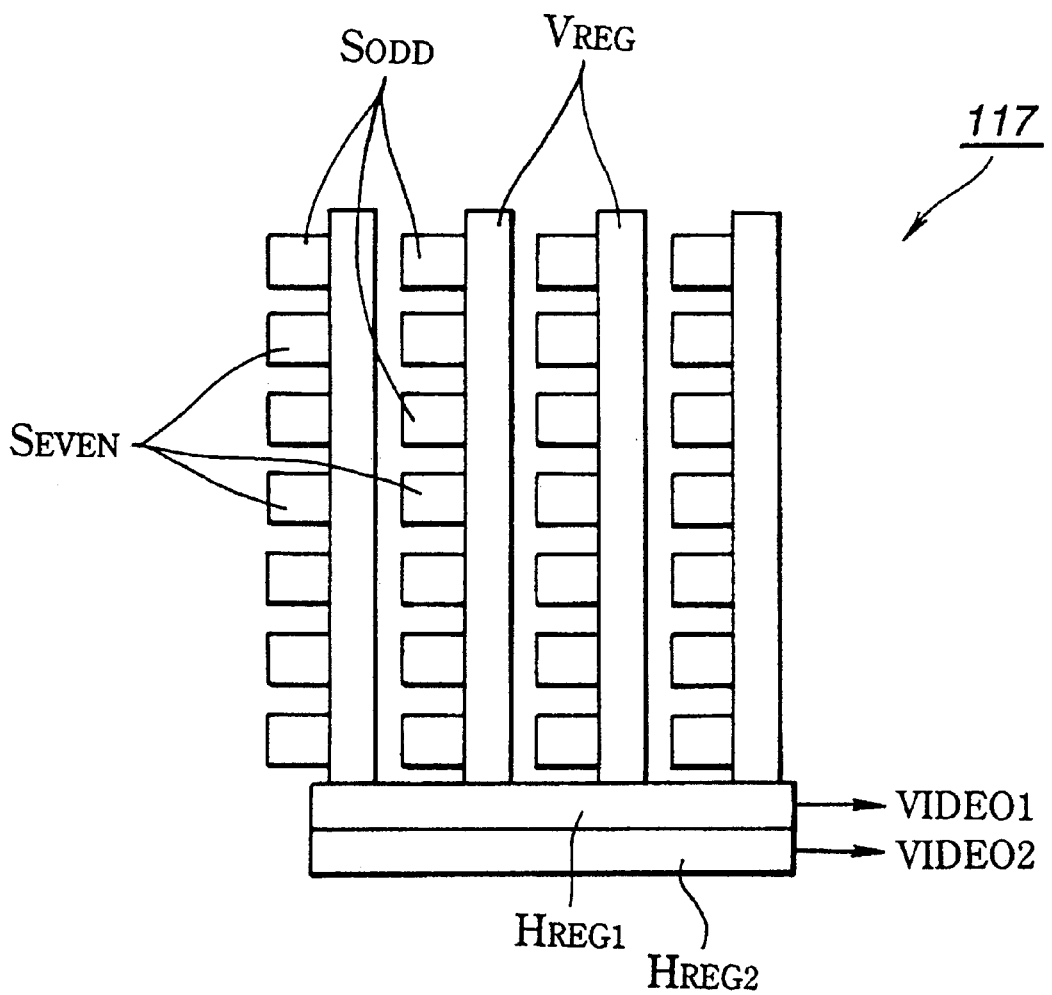
FIG. 9 is a plan view schematically showing the structure of a CCD image sensor in the imaging device.

The CCD image sensor 117 is a full-pixel read CCD image sensor of interline transfer (IT) type using two-line simultaneous reading, having a structure as shown in FIG. 9. The CCD image sensor 117 includes a light-receiving section $S_{ODD}$ corresponding to each pixel of an odd field and a light-receiving section $S_{EVEN}$ corresponding to each pixel of an even field, a vertical transfer section $V_{REG}$ where electric charges of all the pixels stored in the light-receiving sections $S_{ODD}$, $S_{EVEN}$ are read out every one field, and horizontal transfer sections $H_{REG1}$, $H_{REG2}$ for two lines adapted for outputting the electric charges read out in the vertical transfer section $V_{REG}$ as an imaging signal on the one-horizontal line basis. The CCD image sensor 117 has an electronic shutter function to control the charge storage time by controlling the electric potential of a substrate, not shown, formed below the light-receiving sections $S_{ODD}$, $S_{EVEN}$ so as to sweep the electric charges stored in the light-receiving sections $S_{ODD}$, $S_{EVEN}$ to the substrate.

The synchronizing signal generator 111A is supplied with a clock CL of about 14.3 MHz generated by carrying out frequency division of the master clock MCK to ½, from the timing generator 115. The synchronizing signal generator 111A, operating on the basis of the clock CL, generates internal signals VD, HD, and generates a CL/4 signal having a frequency of about 3.5 MHz by carrying out frequency division of the clock CL to ¼. The synchronizing signal generator 111A has a structure which enables external synchronization. When external synchronizing signals EXT-VD, EXT-HD are supplied to the terminals C1, C2, the synchronizing signal generator 111A generates internal synchronizing signals VD, HD synchronized with the external synchronizing signals EXT-VD, EXT-HD. The internal synchronizing signals VD, HD and the CL/4 signal generated by the synchronizing signal generator 111A are supplied to the sub-synchronizing signal generator 111B. In addition, the internal synchronizing signals VD, HD are supplied to the gate signal generator 112 and the processing section 119.

Figure 10:
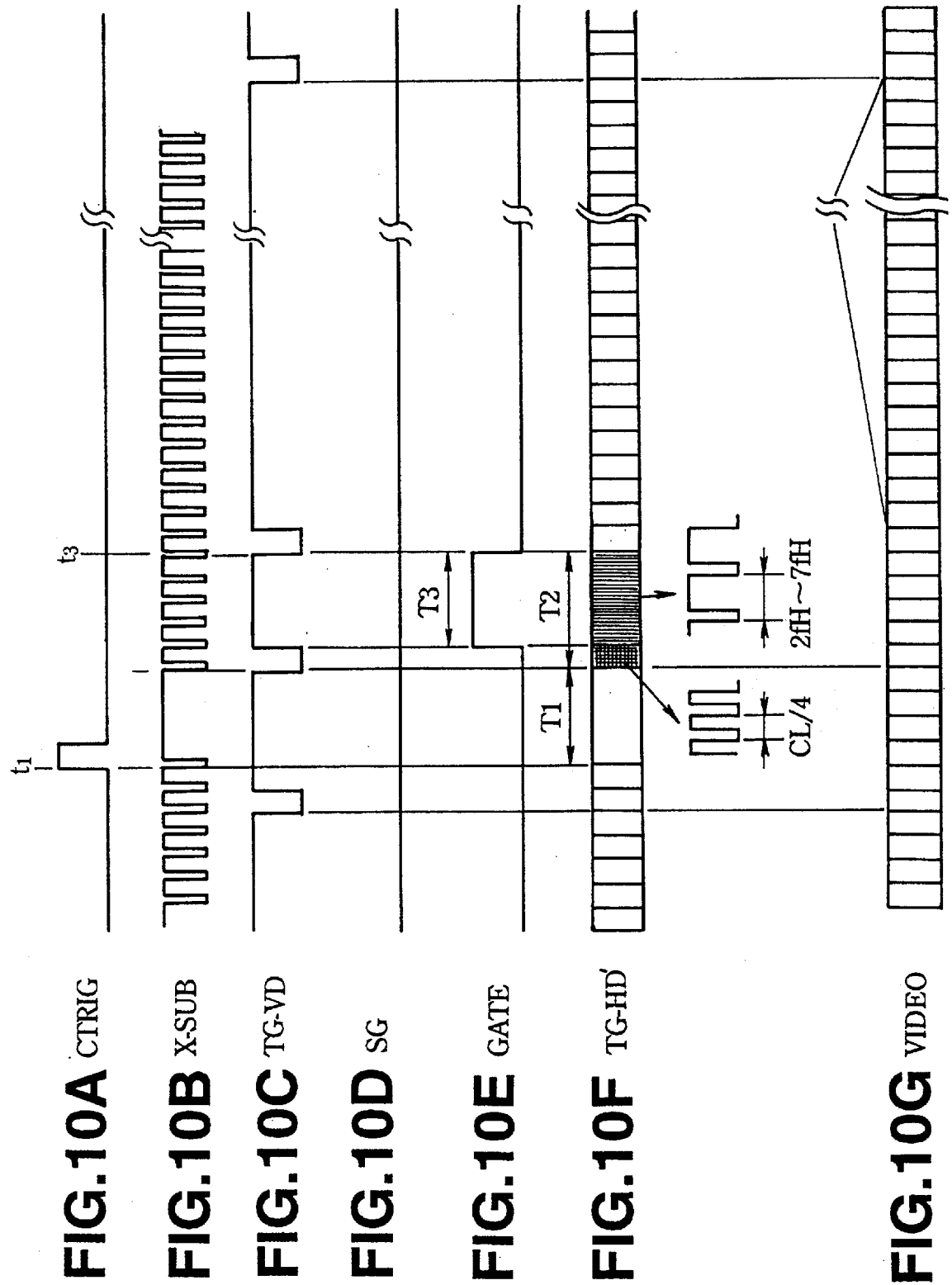
FIG. 10 is a timing chart showing the operation of the imaging device.

The sub-synchronizing signal generator 111B generates a modulated vertical synchronizing signal TG-VD, a modulated horizontal synchronizing signal TG-HD and an electronic shutter control signal X-SUB based on a timing t1 of the trigger signal CTRIG supplied to the terminal C4 as a reference. The sub-synchronizing signal generator 111B generates a modulated vertical synchronizing signal TG-VD as shown in FIG. 10C based on a rise timing t1 of the trigger signal CTRIG as shown FIG. 10A. The sub-synchronizing signal generator 111B stops the electronic shutter control signal X-SUB a shown in FIG. 10B only during a period T1 corresponding to a preset shutter speed on the basis of the modulated vertical synchronizing signal TG-VD, and generates a modulated horizontal synchronizing signal TG-HD such that the CL/4 signal is generated only during a predetermined period T2 after the lapse of the period T1 while the normal internal horizontal synchronizing signal HD is generated during periods other than the periods T1, T2. Then, the modulated vertical synchronizing signal TG-VD generated by the sub-synchronizing signal generator 111B is supplied to the timing generator 115, and the modulated horizontal synchronizing signal TG-HD is supplied to the switch circuit 113. The electronic shutter control signal X-SUB is supplied to the CCD driving section 116.

The gate signal generator 112 generates a gate signal GATE as shown in FIG. 10E which has the logic "H" only during a predetermined period T3 (in this case, a 19H period) in the period T2 after the lapse of 16H period during which 16 of the internal horizontal synchronizing signals HD are counted, on the basis of the leading edge timing t1 of the trigger signal CTRIG supplied to the terminal C4. The gate signal GATE generated by the gate signal generator 112 is supplied to the switch circuit 113.

The switch circuit 113 is supplied with a high-speed horizontal synchronizing signal Hi-HD having a frequency twice the horizontal synchronizing frequency $f_H$ of the CCIR system through the terminal C4 from the imaging control device 120. The switch circuit 113 selects the high-speed horizontal synchronizing signal Hi-HD only during the period T3 in which the gate signal GATE has the logic "H", and selects the modulated horizontal synchronizing signal TG-HD supplied from the sub-synchronizing signal generator 111B during the periods other than the period T3. The high-speed horizontal synchronizing signal Hi-HD and a modulated horizontal synchronizing signal TG-HD' as shown in FIG. 10F made of the modulated horizontal synchronizing signal TG-HD selected by the switch circuit 113 are supplied to the timing generator 115.

On the basis of the modulated vertical synchronizing signal TG-VD supplied from the sub-synchronizing signal generator 111B and the high-speed horizontal synchronizing signal Hi-HD and the modulated horizontal synchronizing signal TG-HD' selected by the switch circuit 113, the timing generator 115 generates various timing signals necessary for driving the CCD image sensor 117 and supplies these various timing signals to the CCD driving section 116.

The CCD driving section 116 generates a sensor gate signal SG shown in FIG. 10D and driving pulses, such as, a horizontal transfer pulse and a vertical transfer pulse, based on the various timing signals and the electronic shutter control signal X-SUB, so as to drive the CCD image sensor 117.

The CDS circuit 118 carries out so-called correlated double sampling based on the sampling pulse supplied from the timing generator 115, with respect to the imaging signal read by two-line simultaneous reading from the CCD image sensor 117. Thus, the CDS circuit 118 takes out information components of the imaging signal and removes noise, such as, reset noise, included in the imaging signal.

The processing section 119 carries out predetermined processing, such as, gamma correction, of the imaging signal supplied from CDS circuit 118. Video signals VIDEO1, VIDEO2, as shown in FIG. 10G, supplied from the processing section 119 are supplied through a terminal C5 to the imaging control device 120.

The imaging control device 120 has a memory 121 supplied with the video signals VIDEO1, VIDEO2 obtained by the imaging device 110 through a terminal C51, and a memory controller 122 for controlling writing/reading of data to/from the memory 121. This imaging control device 120 also has a synchronizing signal generator 123, a sub-synchronizing signal generator 124, a high-speed horizontal synchronizing signal generator 125, a master clock generator 126, and a trigger signal generator 127. A trigger signal CTRIG generated by the trigger signal generator 127 is supplied to the memory controller 122 and the sub-synchronizing signal generator 124, and is also outputted through a terminal C41. In addition, the imaging control device 120 has a signal adder 128 for appending a composite synchronizing signal MCS of a 50-Hz cycle in conformity to the CCIR system to the video signal read out from the memory 121. The imaging control device 120 outputs a video signal VIDEO in conformity to the CCIR system through a terminal C52 from the signal adder 128.

In this imaging control device 120, the synchronizing signal generator 123 generates a master vertical synchronizing signal MVD of a 50-Hz cycle in conformity to the CCIR system based on the master clock MCK of about 28.6 MHz supplied from the master clock generator 126, a composite synchronizing signal MCS, and synchronizing signals VD, HD. The synchronizing signal generator 123 also generates a 2FH signal having a frequency twice the frequency of the horizontal synchronizing signal HD and a CL/4 signal formed by carrying out frequency division of the master clock MCK to ¼. The master vertical synchronizing signal MVD generated by the synchronizing signal generator 123 is supplied to the memory controller 122 and the trigger signal generator 127. The synchronizing signals VD, HD are supplied to the memory controller 122. Also, the vertical synchronizing signal VD and the 2FH signal are supplied to the sub-synchronizing signal generator 124. In addition, the horizontal synchronizing signal HD is supplied as an external synchronizing signal EXT-HD through a terminal C21 to the imaging device 110.

Figure 11:
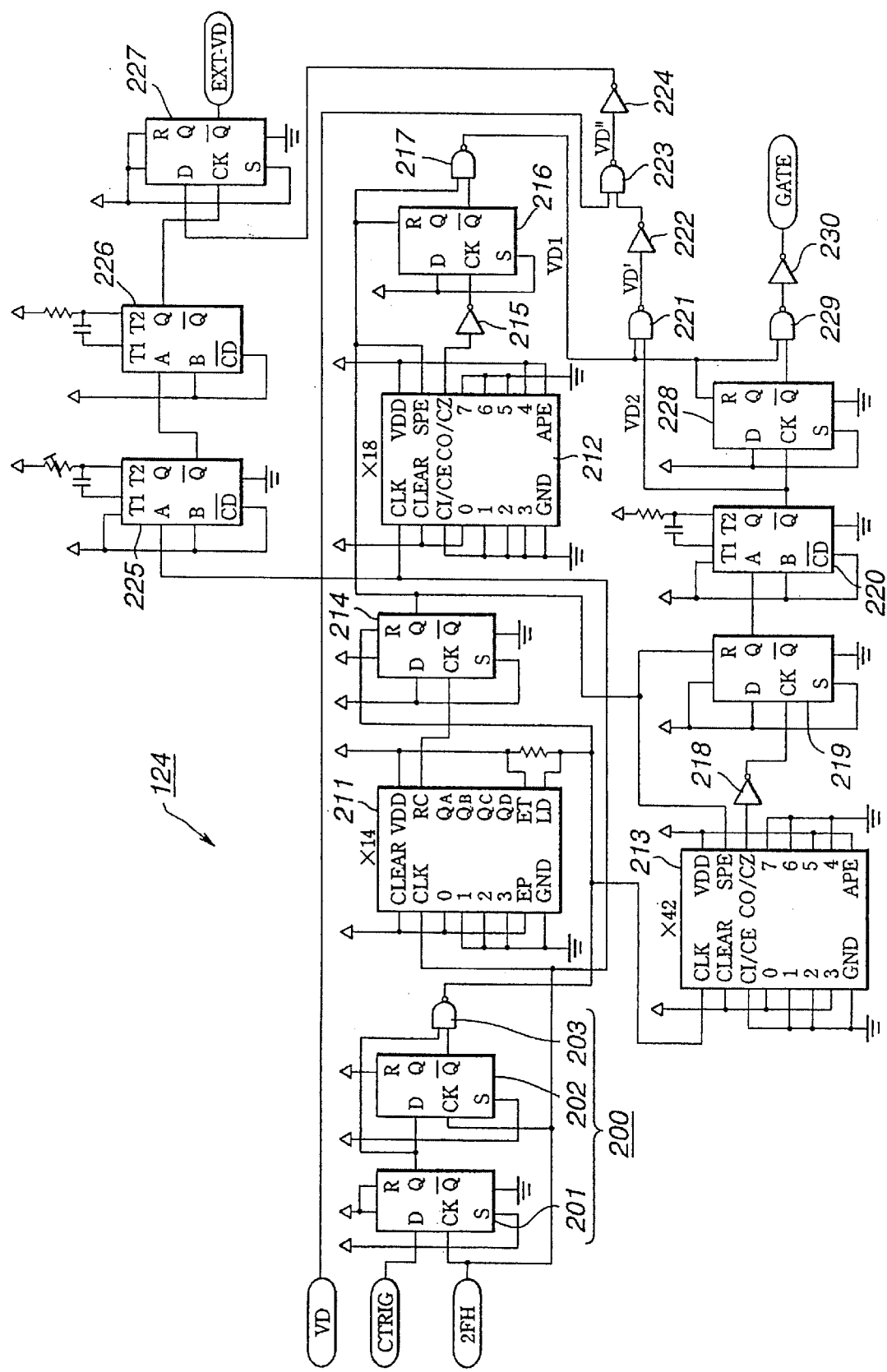
FIG. 11 is a circuit diagram showing the specific structure of a sub-synchronizing signal generator in an imaging control device used in the imaging system.

The sub-synchronizing signal generator 124 is adapted for generating an external synchronizing signal EXT-VD to be supplied to the imaging device 110 from the trigger signal CTRIG, the vertical synchronizing signal VD and the 2FH signal, and has a structure as shown in FIG. 11.

The sub-synchronizing signal generator 124 shown in FIG. 11 has an edge detection circuit 200 which is supplied with the trigger signal CTRIG and the 2FH signal, and first to third counters 211, 212, 213 with their respective clock input terminals CLK supplied with the 2FH signal.

The edge detection circuit 200 includes first and second D-flip-flops 201, 202 with their respective clock input terminals CK supplied with the 2FH signal, and a NAND gate 203 which is supplied with a non-inversion output of the first D-flip-flop 201 and an inversion output of the second D-flip-flop 202. The trigger signal CTRIG is supplied to a data input terminal D of the first D-flip-flop 201, and a non-inversion output of the first D-flip-flop 201 is supplied to a data input terminal D of the second D-flip-flop 202. The edge detection circuit 200 of such structure detects the leading edge of the trigger signal CTRIG. A detection output of the edge detection circuit 200 is supplied to a load terminal LD of the first counter 211 and is also supplied to a reset terminal R of a D-flip-flop 214.

The first counter 211 is a 4-bit binary counter for performing count-up operation at the leading edge of the 2FH signal. As the detection output of the edge detection circuit 200 is supplied to the load terminal LD, [1000] is preset every leading edge of the trigger signal CTRIG, and count-up is carried out every leading edge of the 2FH signal so as to supply a carry output RC thereof to a clock input terminal CK of the D-flip-flop 214.

In the D-flip-flop 214, a data input terminal D is provided with the logic "H". As the detection output of the edge detection circuit 200 is supplied to the reset terminal R, the D-flip-flop 214 is reset every leading edge of the trigger signal CTRIG, and the logic "H" of the data input terminal D is latched with reference to the carry output RC of the first counter 211 as a clock. A non-inversion output thereof is supplied to each of control input terminals SPE of the second and third counters 212, 213, and is also supplied to reset terminals R of the D-flip-flops 216, 219.

The second counter 212 is an 8-bit binary programmable down-counter. During a period when the control input terminal SPE thereof has the logic "L", that is, during a period until the D-flip-flop 214 is reset at the timing t1 of the leading edge of the trigger signal CTRIG so as to output the logic "H" by the carry output RC of the first counter 211, [10001000] is preset at the timing of the leading edge of the 2FH signal. After that, when the control input terminal SPE has the logic "H", the second counter 212 carries out count-down every leading edge of the 2FH signal, and supplies a count output CO/CZ through an inverter 215 of a NAND gate to a clock input terminal CK of the D-flip-flop 216.

In the D-flip-flop 216, a data input terminal D is provided with the logic "H". As the output of the D-flip-flop 214 is supplied to the reset terminal R, the D-flip-flop 216 is reset every leading edge of the output of the D-flip-flop 214, and the logic "H" of the data input terminal D is latched with reference to an inversion signal of the count output CO/CZ of the second counter 212 as a clock. An inversion output thereof is supplied to one input terminal of a NAND gate 217.

Figure 12:
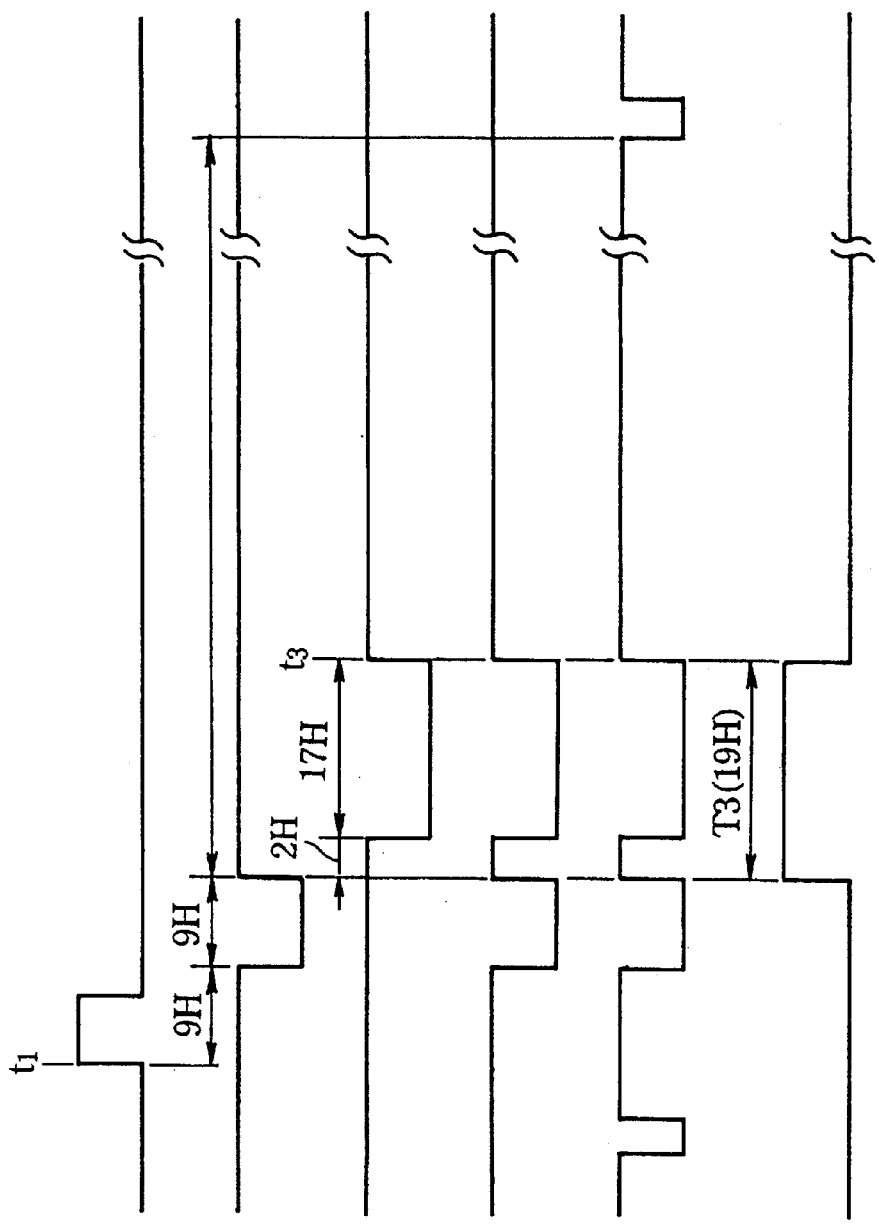
FIG. 12 is a timing chart showing the operation of the sub-synchronizing signal generator.

In this NAND gate 217, the other input terminal is supplied with a non-inversion output of the D-flip-flop 214. As a NAND output of the non-inversion output of the D-flip-flop 214 and the inversion output of the D-flip-flop 216, the NAND gate 217 generates a first vertical synchronizing signal VD1 as shown in FIG. 12B which has the logic "L" only during a 9H period after the lapse of 9H from the timing t1 of the leading edge of the trigger signal CTRIG shown in FIG. 12A.

The output of the NAND gate 217, that is, the first vertical synchronizing signal VD1, is supplied to one input terminal of each of NAND gates 221, 229, and is also supplied to a reset terminal R of a D-flip-flop 228.

The third counter 213 is an 8-bit binary programmable down-counter. During a period when the control input terminal SPE thereof has the logic "L", that is, during a period until the D-flip-flop 214 is reset at the timing t1 of the leading edge of the trigger signal CTRIG so as to output the logic "H" by the carry output RC of the first counter 211, [10010100] is preset at the timing of the leading edge of the 2FH signal. After that, when the control input terminal SPE has the logic "H", the third counter 213 carries out count-down every leading edge of the 2FH signal, and supplies a count output CO/CZ through an inverter 218 of a NAND gate to a clock input terminal CK of the D-flip-flop 219.

In the D-flip-flop 219, a data input terminal D is provided with the logic "H". As the output of the D-flip-flop 214 is supplied to the reset terminal R, the D-flip-flop 219 is reset every leading edge of the output of the D-flip-flop 214, and the logic "H" of the data input terminal D is latched with reference to an inversion signal of the count output CO/CZ of the third counter 213 as a clock. A non-inversion output thereof is supplied to a trigger terminal A of a monostable multivibrator 220.

As the monostable multivibrator 220 is triggered by the non-inversion output of the D-flip-flop 219, the monostable multivibrator 220 generates, as an inversion output thereof, a second vertical synchronizing signal VD2 which has the logic "L" only during a 17H period after the lapse of 20H form the timing t1 of the leading edge of the trigger signal CTRIG, as shown in FIG. 12C.

The inversion output of the monostable multivibrator 220, that is, the second vertical synchronizing signal VD2, is supplied to the other input terminal of the NAND gate 221 and is also supplied to a clock input terminal CK of the D-flip-flop 228.

The NAND gate 221 supplies a NAND output of the first vertical synchronizing signal VD1 supplied from the NAND gate 217 and the second vertical synchronizing signal VD2 supplied form the monostable multivibrator 220, as a signal VD' as shown in FIG. 12D, to one input terminal of a NAND gate 223 through an inverter 222 of a NAND gate.

The NAND gate 223 is supplied, at its other input terminal, with the vertical synchronizing signal VD from the synchronizing signal generator 123, and generates a signal VD" as shown in FIG. 12E as a NAND output of the vertical synchronizing signal VD and the signal VD'. The signal VD" generated by the NAND gate 223 is supplied to a data input terminal D of a D-flip-flop 227 through an inverter 224 of a NAND gate.

The D-flip-flop 227 is supplied, at a clock input terminal CK thereof, with a clock signal generated by performing phase adjustment of the 2FH signal by two stages of monostable multivibrators 225, 226. With this clock signal, the D-flip-flop 227 latches the signal VD".

The sub-synchronizing signal generator 124 supplies the latch output generated by the D-flip-flop 227 as an external synchronizing signal EXT-VD to the imaging device 110 through a terminal C11.

In addition, in this sub-synchronizing signal generator 124, the D-flip-flop 228 is provided with the logic "H" at its data input terminal D, and is reset at the leading edge of the first vertical synchronizing signal VD1 supplied from the NAND gate 217. The D-flip-flop 228 then latches the logic "H" at the data input terminal D with reference to the second vertical synchronizing signal VD2 supplied from the monostable multivibrator 220 as a clock, and supplies its inversion output to the other input terminal of the NAND gate 229.

The NAND gate 229 supplies a NAND output of the first vertical synchronizing signal VD1 supplied from the NAND gate 217 and the inversion output of the D-flip-flop 228, as a gate signal GATE, to the high-speed horizontal synchronizing signal generator 125 through an inverter 230 of a NAND gate. The gate signal GATE has, as shown in FIG. 12F, the logic "H" only during a period T3 of 17H from the timing of the leading edge of the first vertical synchronizing signal VD1 to the timing t2 of the leading edge of the second vertical synchronizing signal VD2.

Figure 13:
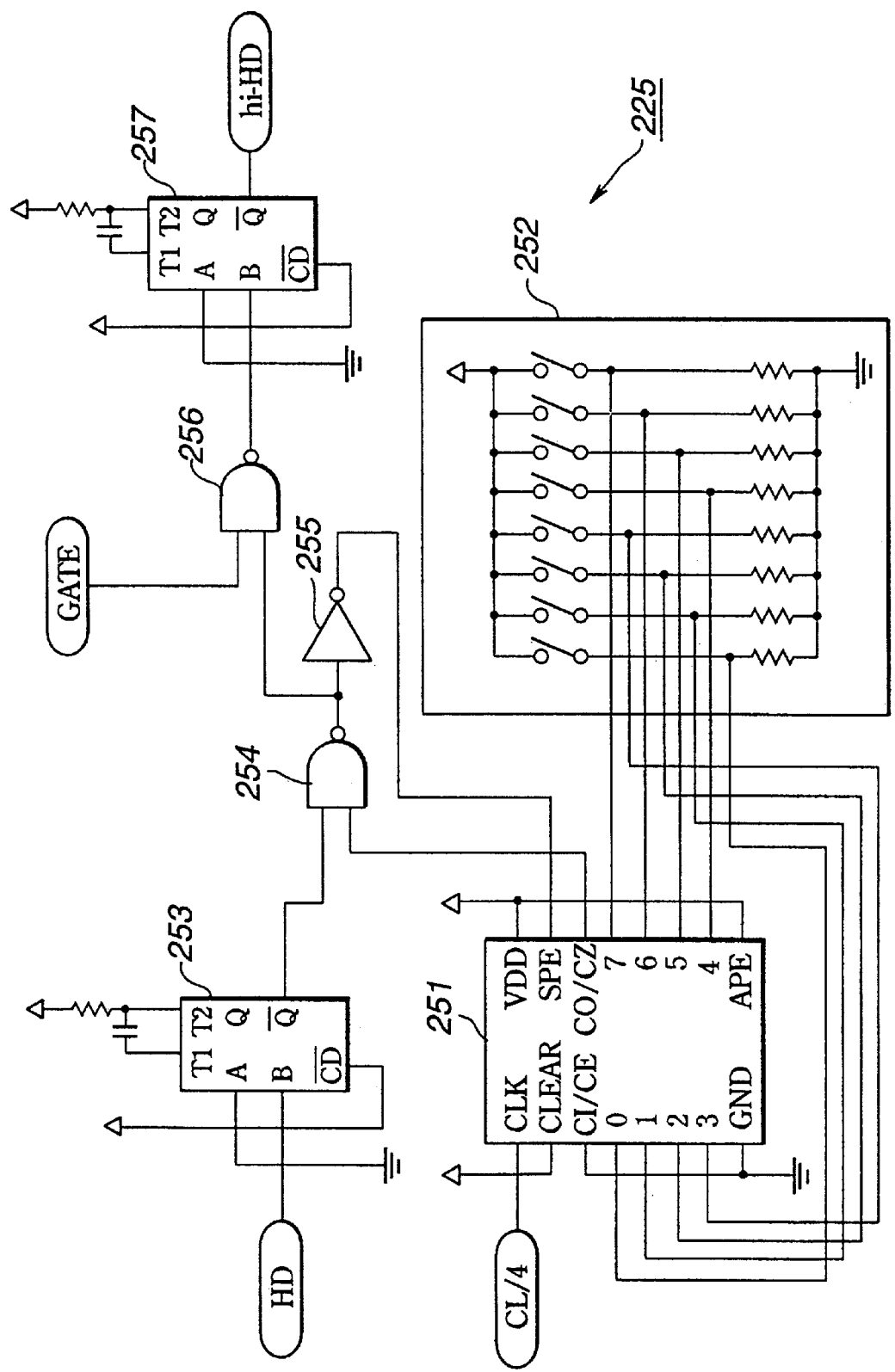
FIG. 13 is a circuit diagram showing the specific structure of a high-speed horizontal synchronizing signal generator in the imaging control device.

The high-speed horizontal synchronizing signal generator 125 is adapted for generating, from the CL/4 signal, a high-speed horizontal synchronizing signal Hi-HD to be supplied to the imaging device 110, and has a structure as shown in FIG. 13, for example.

The high-speed horizontal synchronizing signal generator 125 shown in FIG. 13 has a counter 251 which is supplied with the CL/4 signal at its clock input terminal CLK, and a setting circuit 252 for setting a preset value of the counter 251.

The counter 251 is an 8-bit binary programmable down-counter. During a period when a control input terminal SPE of the counter 251 has the logic "L", the set value is preset by the setting circuit 252 at the timing of the leading edge of the CL/4 signal supplied to the clock input terminal CLK. After that, when the control input terminal SPE has the logic "H", the counter 251 carries out count-down every leading edge of the CL/4 signal so as to supply a pulse having a frequency twice to seven times the frequency of the horizontal synchronizing signal HD, as a count output CO/CZ thereof, to one input terminal of a NAND gate 254.

The NAND gate 254 is supplied, at its other input terminal, with an inversion output of a monostable multivibrator 253 triggered by the horizontal synchronizing signal HD, and is gate-controlled by the inversion output of the monostable multivibrator 253. A NAND output of this NAND gate 254 is supplied to a NAND gate 256, and is also supplied to the control input terminal SPE of the counter 251 through an inverter 255 of a NAND gate.

The NAND gate 256 is supplied, at its other input terminal, with the gate signal GATE from the sub-synchronizing signal generator 124, and is gate-controlled by the gate signal GATE. The NAND gate 256 then supplies the count output CO/CZ of the counter 251 supplied as the NAND output of the NAND gate 254 to a trigger input terminal B of a monostable multivibrator 257 only during a period T3 of 19H during which the gate signal GATE has the logic "H".

This monostable multivibrator 257 is triggered by a frequency twice the frequency of the horizontal synchronizing signal HD by the count output CO/CZ of the counter 251 during the period T3 of 19H, and outputs its inversion output as a high-speed horizontal synchronizing signal Hi-HD.

Figure 14:
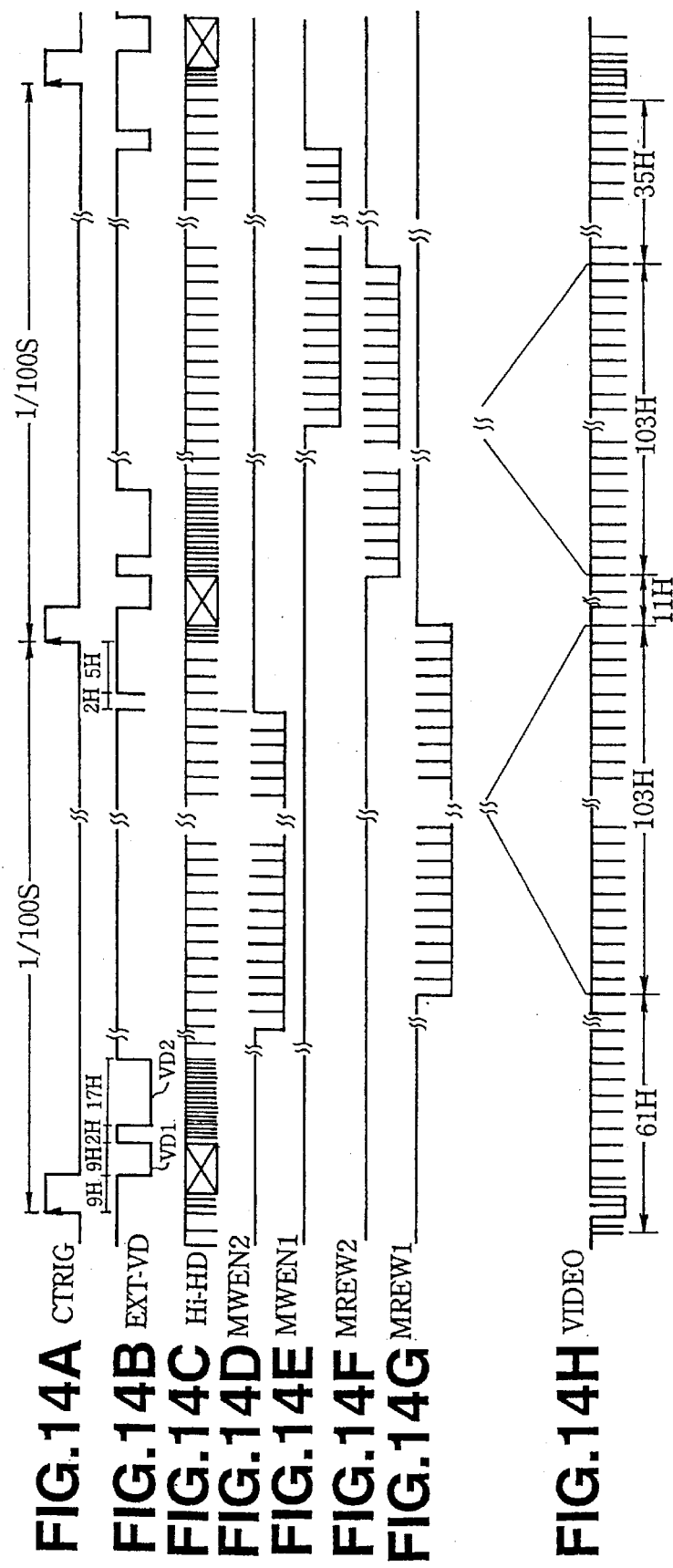
FIG. 14 is a timing chart showing the operation of the imaging control device.

The trigger signal generator 127 generates a trigger signal CTRIG of a cycle repeating $\frac{1}{100}$ seconds as shown in FIG. 14A on the basis of the master vertical synchronizing signal MVD of the 50-Hz cycle in conformity to the CCIR system supplied from the synchronizing signal generator 123.

The memory 121 is controlled in writing/reading of data by the memory controller 122 on the basis of the trigger signal CTRIG and the synchronizing signals VD, HD. The memory 121 takes in the video signals VIDEO1, VIDEO2 supplied through the terminal C51, and supplies these video signals VIDEO1, VIDEO2 as still picture signals to the image processor from the terminal C52.

In the imaging control device 120 of such structure, the horizontal synchronizing signal HD in conformity to the CCIR system generated by the synchronizing signal generator 123 is supplied as an external horizontal synchronizing signal EXT-HD to the imaging device 110. An external synchronizing signal EXT-VD as shown in FIG. 14B, generated by inserting the first vertical synchronizing signal VD1 having the logic "L" only during the 9H period after the lapse of 9H from the timing t1 of the leading edge of the trigger signal CTRIG as shown in FIG. 14A supplied to the imaging device 110 and the second vertical synchronizing signal VD2 having the logic "L" only during the 17H period into the normal vertical synchronizing signal VD in conformity to the CCIR system, is supplied from the sub-synchronizing signal generator 124 to the imaging device 110. In addition, a high-speed horizontal synchronizing signal Hi-HD as shown in FIG. 14C having a frequency twice that of the horizontal synchronizing signal HD is supplied from the high-speed horizontal synchronizing signal generator 125 to the imaging device 110.

In the imaging device 110, on the basis of the external synchronizing signals EXT-VD, EXT-HD, the high-speed horizontal synchronizing signal Hi-HD and the trigger signal CTRIG supplied from the imaging control device 120, imaging by full-pixel reading is carried out in response to the modulated vertical synchronizing signal TG-VD and the shutter control signal X-SUB generated by the sub-synchronizing signal generator 111B, the high-speed horizontal synchronizing signal Hi-HD selected by the switch circuit 113, and the modulated horizontal synchronizing signal TG-HD' constituted by the modulated horizontal synchronizing signal TG-HD.

Figure 15:
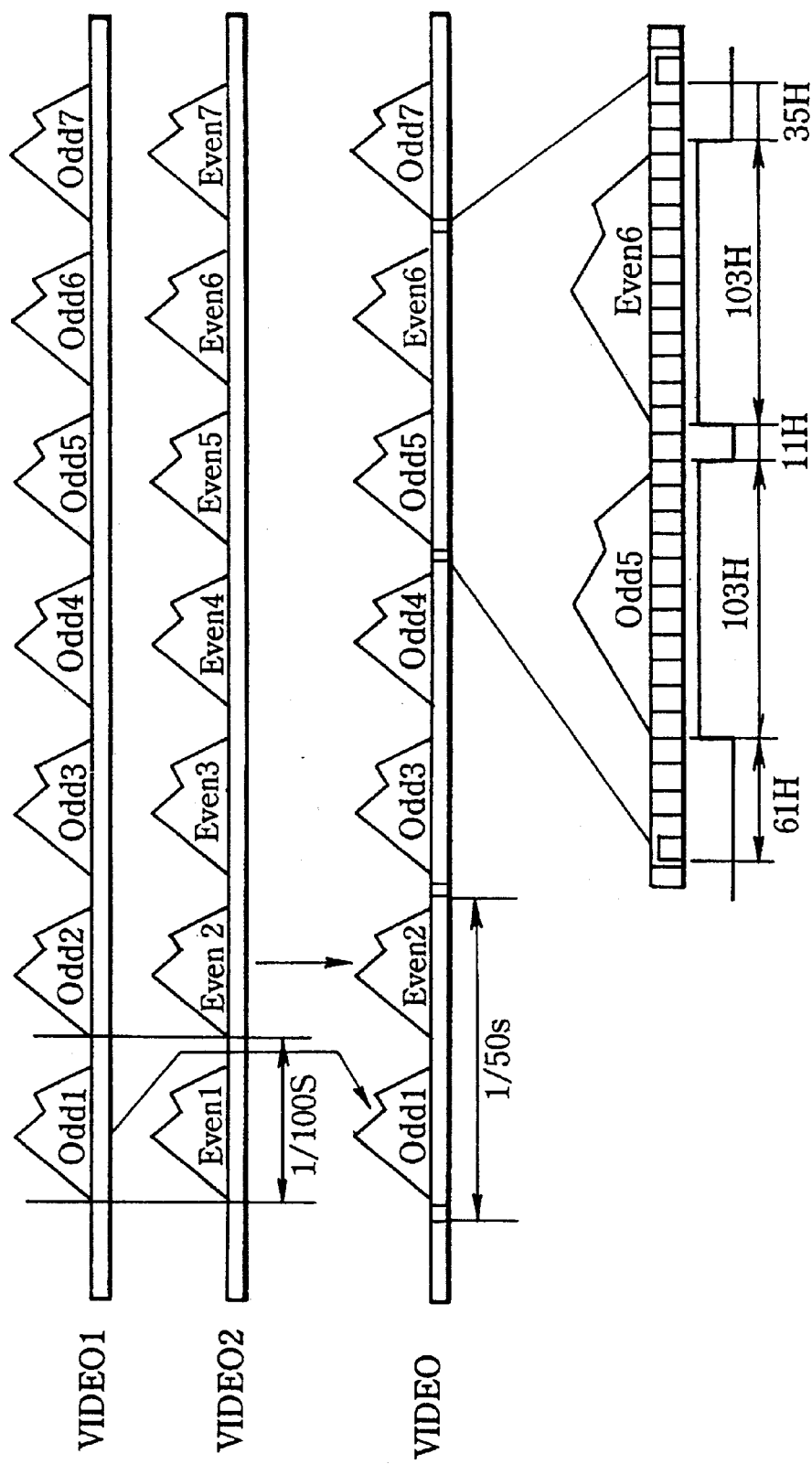
FIG. 15 is a view for explaining a video signal obtained by the imaging control device.

The video signals VIDEO1, VIDEO2 obtained by the imaging device 110 are read out by two-line simultaneous reading by the high-speed horizontal synchronizing signal Hi-HD having the frequency twice that of the horizontal synchronizing signal HD in conformity to the CCIR system. Therefore, the video signals VIDEO1, VIDEO2 are signals of two frames of pictures during one field period, as shown in FIG. 15. Since the frequency of the vertical synchronizing signal VD in conformity to the CCIR system is 50 Hz, imaging signals of two frames of pictures outputted during the one field period are signals imaged with a time difference of 1/100 seconds.

Thus, the memory controller 122 in the imaging control device 120 generates write control signals MWEN2, MWEN1 as shown in FIGS. 14D and 14E and read control signals MREN2, MREN1 as shown in FIGS. 14F and 14G on the basis of the master vertical synchronizing signal MVD and the synchronizing signals VD, HD of the 50-Hz cycle in conformity to the CCIR system generated by the synchronizing signal generator 123 and the trigger signal CTRIG generated by the trigger signal generator 127, and controls writing/reading of data with respect to the memory 121. That is, the memory controller 122 controls writing/reading with respect to the memory 121 so that the video signals VIDEO1, VIDEO2 read out by two-line simultaneous reading by the imaging device 110 are taken into the memory 121 so as to read out the video signal of the odd field in the former one frame of the two frames of video signals and the video signal of the even field in the latter one frame.

Figure 16:
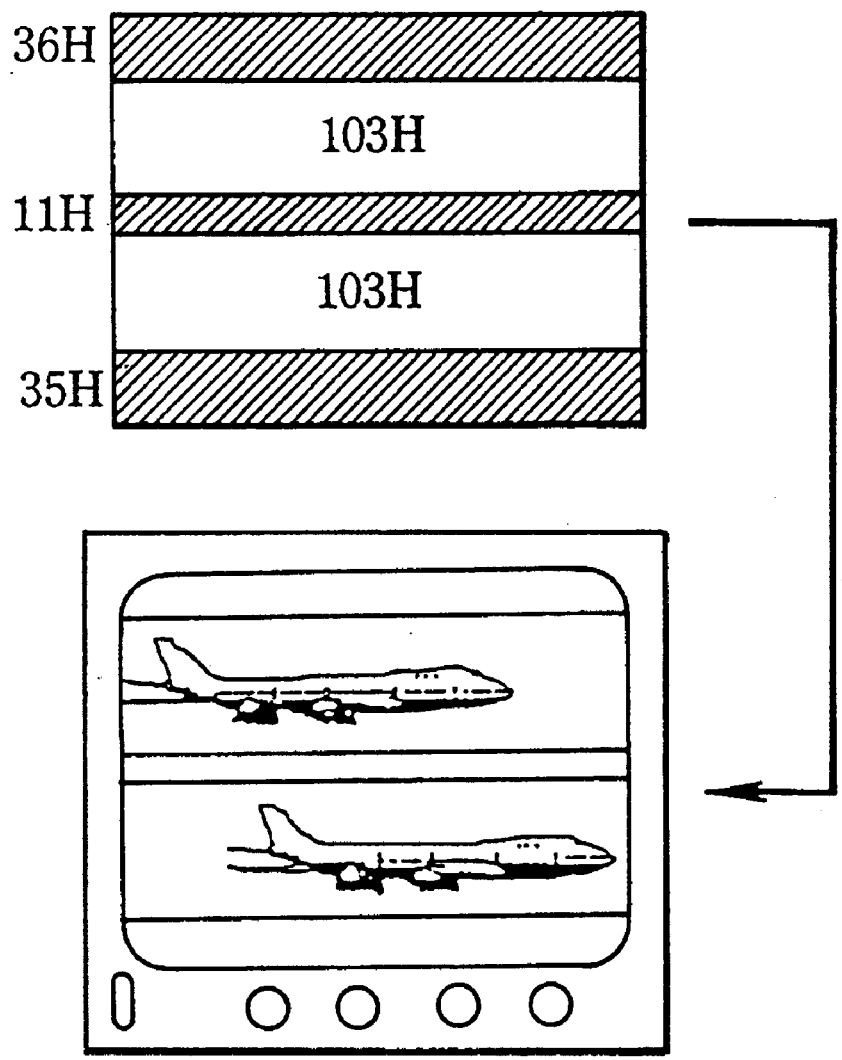
FIG. 16 is a view showing an image displayed on a monitor screen by the video signal obtained by the imaging control device.

Thus, as shown in FIG. 14H, a video signal VIDEO for one field is outputted by the memory 121 from the video signal of the odd field in the former one frame and the video signal of the even field in the latter one frame which are imaged with the time difference of 1/100 seconds. Specifically, a video signal of a 100-Hz cycle having 103 lines of effective image period is outputted including 11 lines of interval in a sink period of 50 Hz. Then, the signal adder 128 appends a composite synchronizing signal MCS of a 50-Hz cycle in conformity to the CCIR system to the video signal thus read out from the memory 121. The video signal VIDEO outputted through the terminal C52 from the signal adder 128 is a video signal in conformity to the CCIR system such that an image accurately 1/100 seconds later than an image on the upper side of the screen of a monitor is outputted on the lower side of the screen, as shown in FIG. 16.

In this imaging system, a video signal including images imaged by the imaging device 110 with an accurate time difference of 1/100 seconds in the former and latter halves of the screen is obtained from the memory 121, and this video signal is supplied as a still picture signal to the image processor 130.

The video signal read out from the memory 121 has a scan rate twice that of the CCIR system. However, since the normal CCIR synchronizing signal is appended to the video signal by the signal adder 128, the video signal may be recorded by a video tape recorder.

As described above, in the imaging control method, the imaging control device, the imaging system and the imaging device according to the present invention, a standard vertical synchronizing signal and a standard horizontal synchronizing signal in conformity to the standard television system are generated, and a trigger signal having a cycle not more than ½ of the cycle of the standard vertical synchronizing signal. At a first timing corresponding to the trigger signal, all electric charges stored in each of the light-receiving elements of the interline transfer type solid-state imaging element are eliminated as ineffective charges. At a second timing after a predetermined time from the first timing, electric charges stored in the plural light-receiving elements are read out to the vertical transfer section. During a first period from the second timing to a third timing, the electric charges transferred to the vertical transfer section are vertically transferred at a first transfer speed. During a second period from the third timing to a fourth timing, which is the timing of next trigger signal, the electric charges of the vertical transfer section are vertically transferred at a second transfer speed which is lower than the first transfer speed and corresponding to the standard television system. Thus, the interline transfer type solid-state imaging element is controlled so that one frame of image information is outputted every cycle of the trigger signal through the vertical transfer section. Then, the image information outputted from the interline transfer type solid-state imaging element during plural cycles of the trigger signal is temporarily stored. The stored plural frames of image information are read out as one frame of output image information at a speed based on the standard vertical synchronizing signal and the standard horizontal synchronizing signal. The standard vertical synchronizing signal and the standard horizontal synchronizing signal of the standard television system are appended to the read out one frame of output image information. Thus, it is possible to image a fast moving object with a predetermined time difference and obtain image information compounded into one image. Therefore, for example, by generating a standard vertical synchronizing signal and a horizontal synchronizing signal in conformity to the CCIR (International Radio Consultative Committee) system, then generating a trigger signal having a cycle ½ of the standard vertical synchronizing signal, and performing imaging control of the imaging device of the CCIR system, images having a time difference of 1/100 seconds may be compounded into one image to be outputted.

Figure 17:
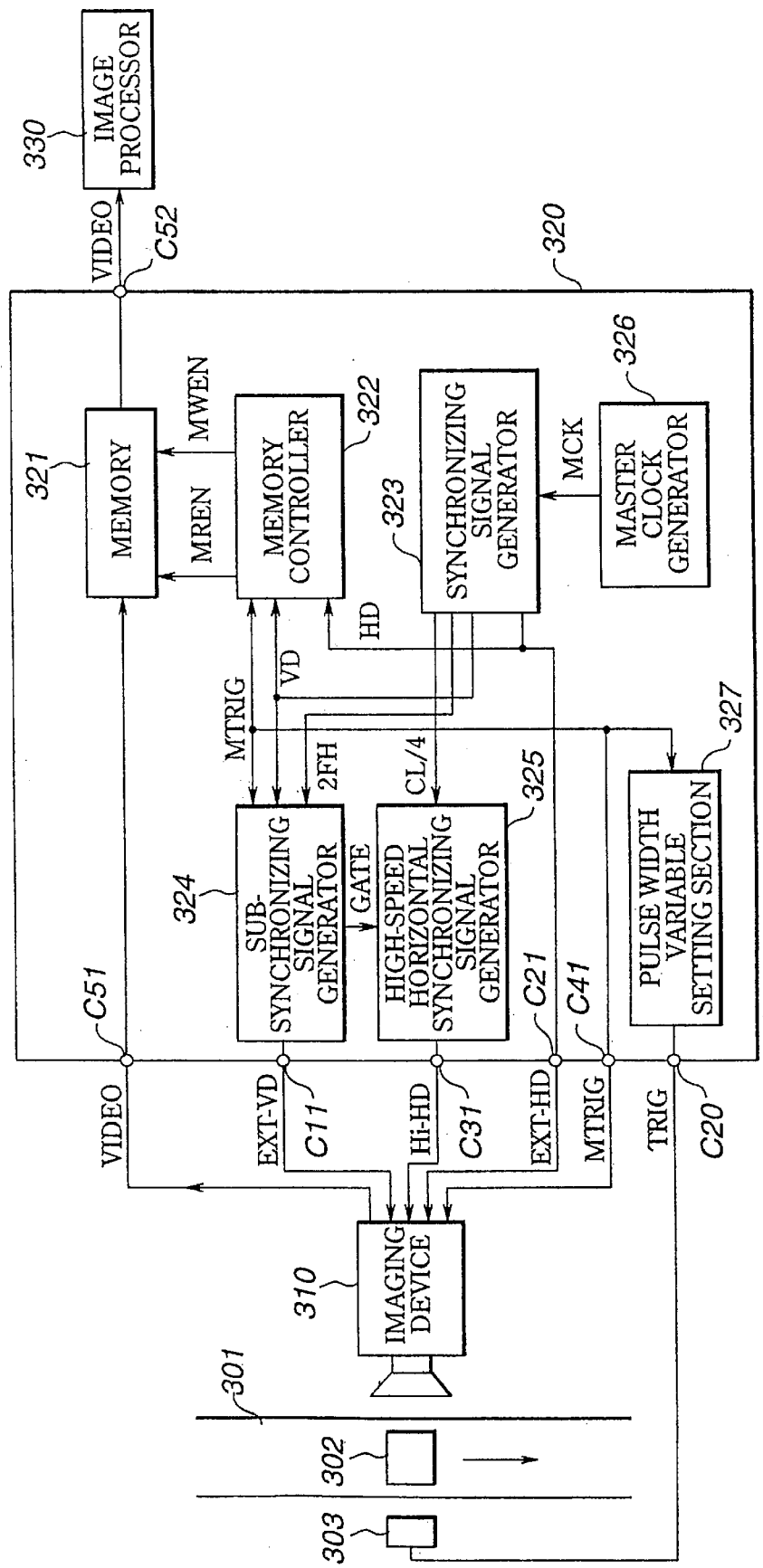
FIG. 17 is a view showing the entire structure of another imaging system according to the present invention.

The present invention is also applied to an imaging system having a structure as shown in FIG. 17. This imaging system is an imaging system for imaging a detection object 302 by an imaging device 310 on the basis of a detection output of an object sensor 303 for detecting the detection object 302 transferred by a transfer path 301 made of a belt conveyer, so as to take in the imaged detection object 302 as a still picture. The imaging system includes an imaging control device 320 for controlling the operation of the imaging device 310 in response to the detection output of the object sensor 303 so as to take in a video signal from the imaging device 310 as a still picture signal into a memory 321, and an image processor 330 to which the video signal from the imaging device 310 is supplied as a still picture signal through the memory 321.

In this imaging system, the object sensor 303 detects the detection object 302 transferred by the transfer path 301. When the detection object 302 reaches the front side of the object sensor 303, the object sensor 303 generates a trigger signal TRIG and supplies this trigger signal TRIG to the imaging control device 320.

Figure 18:
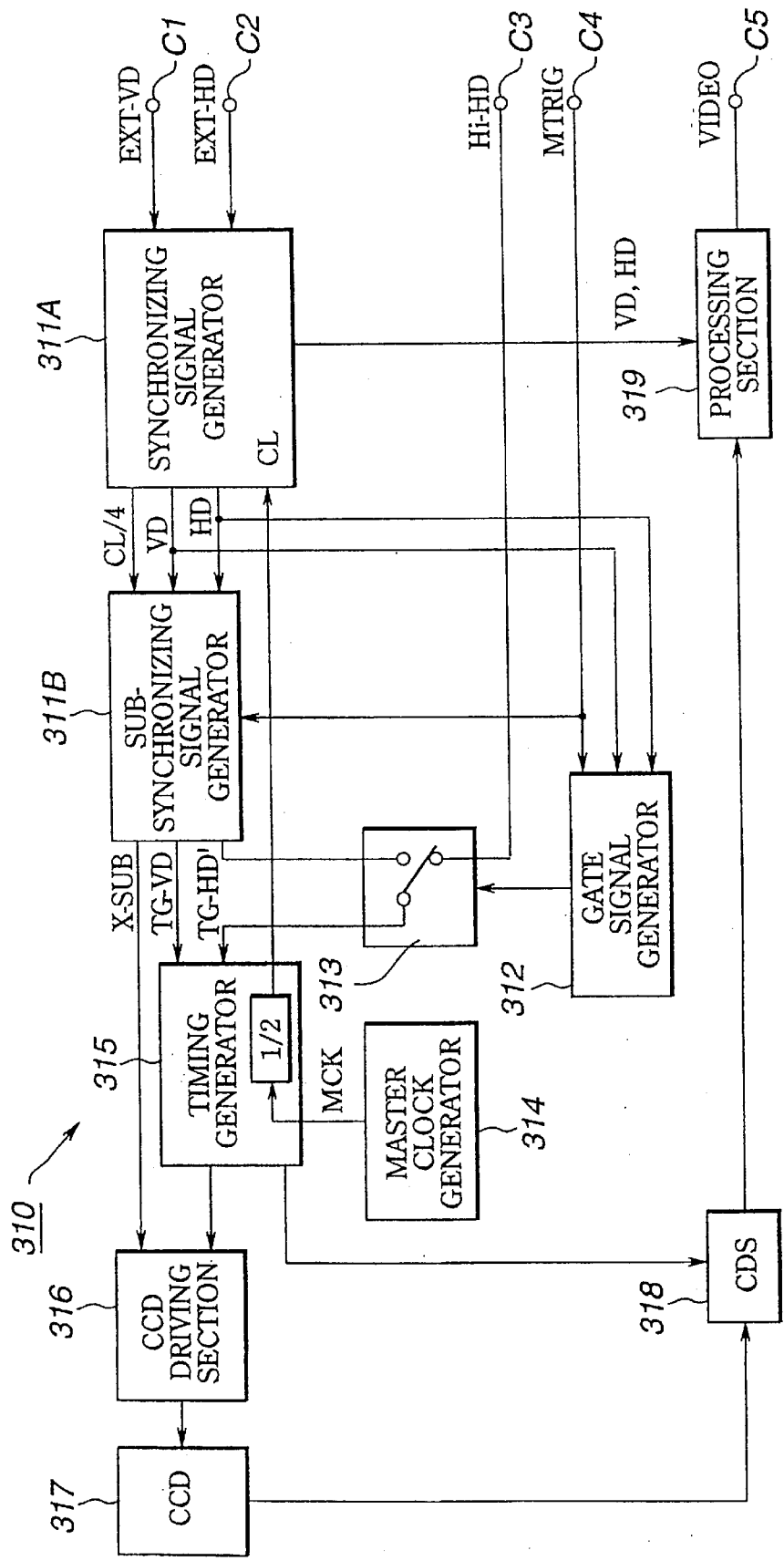
FIG. 18 is a block diagram showing the structure of an imaging device used in the imaging system.

The imaging device 310 has, as shown in FIG. 18, a synchronizing signal generator 311A to which external synchronizing signals EXT-VD, EXT-HD are supplied through terminals C1, C2 from the imaging control device 320, a sub-synchronizing signal generator 311B and a gate signal generator 312 to which a modulated trigger signal MTRIG is supplied through a terminal C4 from the imaging control device 320, a switch circuit 313 switch-controlled by a gate signal GATE supplied from the gate signal generator 312, a timing generator 315 caused to operate by a master clock MCK of about 28.6 MHz supplied from a master clock generator 314, a CCD image sensor 317 driven by a CCD driving section 316 operating in response to various timing signals supplied from the timing generator 315, and a processing section 319 to which an imaging signal from the CCD image sensor 317 is supplied through a correlated double sampling (CDS) circuit 318.

Figure 19:
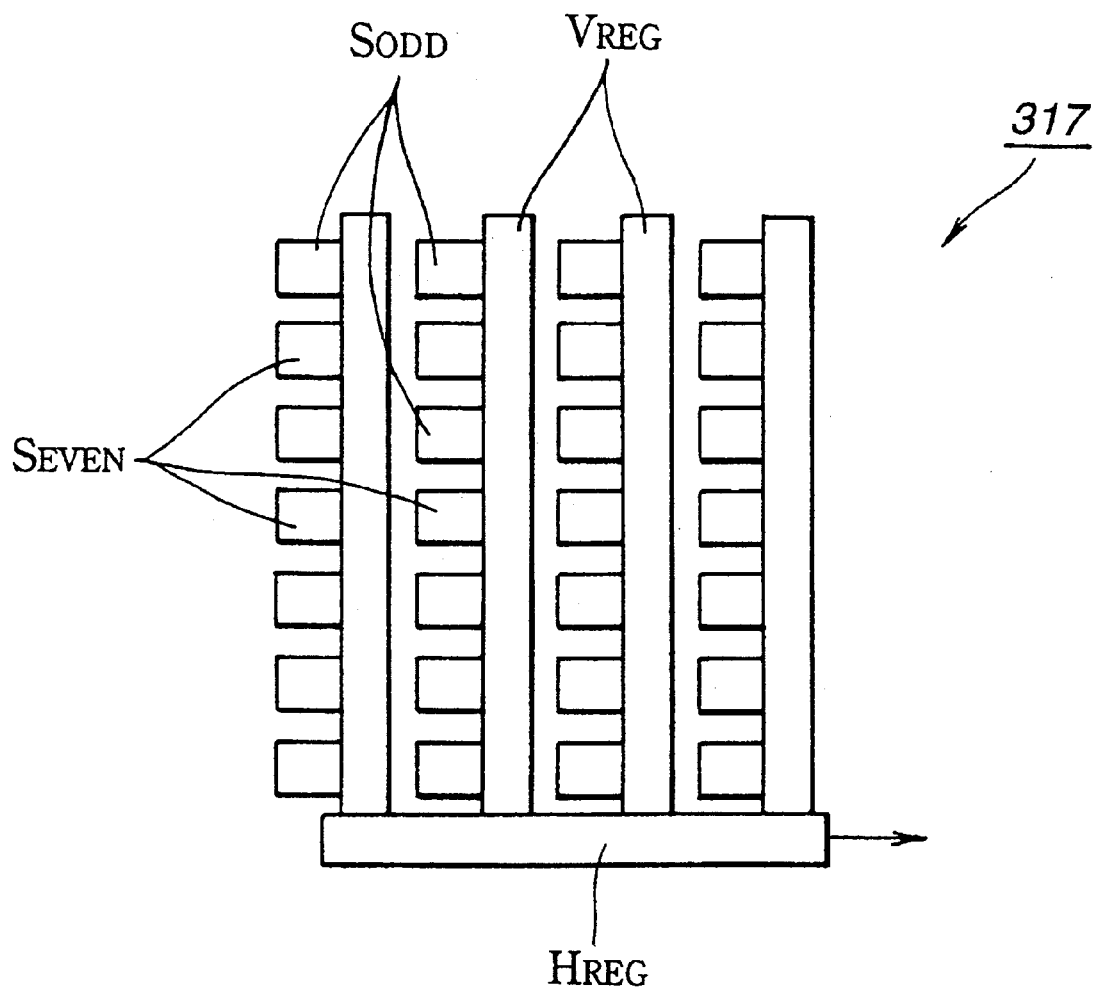
FIG. 19 is a plan view schematically showing the structure of a CCD image sensor in the imaging device.

The CCD image sensor 317 is an interline transfer (IT) type CCD image sensor having a structure as shown in FIG. 19, and includes a light-receiving section $S_{ODD}$ corresponding to each pixel of an odd field and a light-receiving section $S_{EVEN}$ corresponding to each pixel of an even field, a vertical transfer section $V_{REG}$ where electric charges stored in the light-receiving sections $S_{ODD}$, $S_{EVEN}$ are read out, and a horizontal transfer section $H_{REG}$ for outputting the electric charges read out in the vertical transfer section $V_{REG}$ as an imaging signal on the one-horizontal line basis. The CCD image sensor 317 has an electronic shutter function to control the charge storage time by controlling the electric potential of a substrate, not shown, formed below the light-receiving sections $S_{ODD}$, $S_{EVEN}$ so as to sweep the electric charges stored in the light-receiving sections $S_{ODD}$, $S_{EVEN}$ to the substrate.

The synchronizing signal generator 311A is supplied with a clock CL of about 14.3 MHz generated by carrying out frequency division of the master clock MCK to ½, from the timing generator 115. The synchronizing signal generator 311A, operating on the basis of the clock CL, generates internal signals VD, HD, and generates a CL/4 signal having a frequency of about 3.5 MHz by carrying out frequency division of the clock CL to ¼. The synchronizing signal generator 311A has a structure which enables external synchronization. When external synchronizing signals EXT-VD, EXT-HD are supplied to the terminals C1, C2, the synchronizing signal generator 311A generates internal synchronizing signals VD, HD synchronized with the external synchronizing signals EXT-VD, EXT-HD. The internal synchronizing signals VD, HD and the CL/4 signal generated by the synchronizing signal generator 311A are supplied to the sub-synchronizing signal generator 311B. In addition, the internal synchronizing signals VD, HD are supplied to the gate signal generator 312 and the processing section 319.

Figure 20:
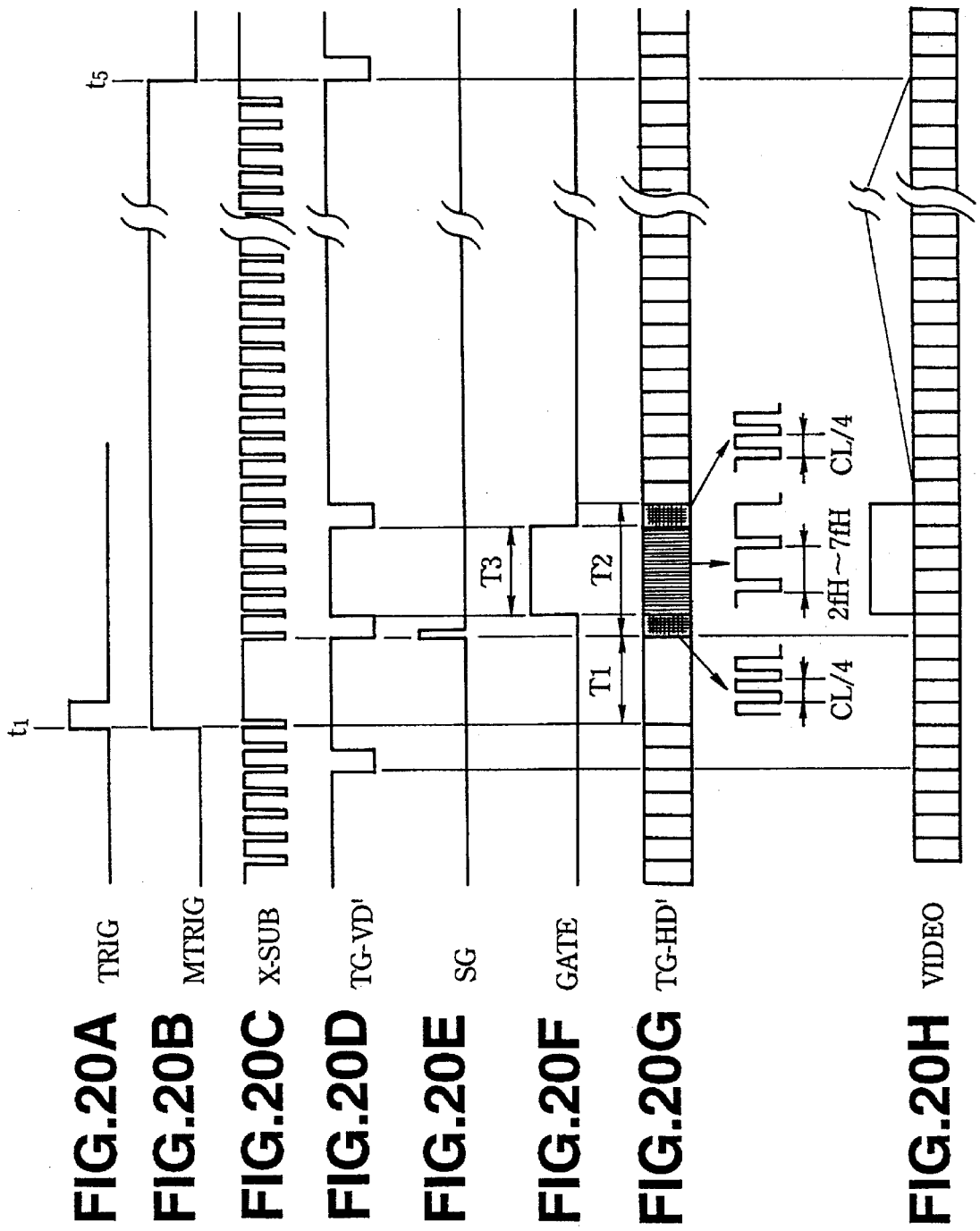
FIG. 20 is a timing chart showing the operation of the imaging device.

The sub-synchronizing signal generator 311B is supplied, at its terminal C4, with a modulated trigger signal MTRIG as shown in FIG. 20B obtained by varying the pulse width of a trigger signal TRIG as shown in FIG. 20A. The sub-synchronizing signal generator 311B generates a modulated vertical synchronizing signal TG-VD as shown in FIG. 20D based on a rise timing t1 of the modulated trigger signal MTRIG supplied to the terminal C4. The sub-synchronizing signal generator 311B stops the electronic shutter control signal X-SUB a shown in FIG. 20C only during a period T1 corresponding to a preset shutter speed on the basis of the modulated vertical synchronizing signal TG-VD, and generates a modulated horizontal synchronizing signal TG-HD such that the CL/4 signal is generated only during a predetermined period T2 after the lapse of the period T1 while the internal horizontal synchronizing signal HD in conformity to the standard television system is generated during periods other than the periods T1, T2.

Then, the modulated vertical synchronizing signal TG-VD generated by the sub-synchronizing signal generator 311B is supplied to the timing generator 315, and the modulated horizontal synchronizing signal TG-HD is supplied to the switch circuit 313. The electronic shutter control signal X-SUB is supplied to the CCD driving section 316.

The gate signal generator 312 generates a gate signal GATE as shown in FIG. 20F which has the logic "H" only during a predetermined period T3 (in this case, a 21H period) in the period T2 after the lapse of 16H period during which 16 of the internal horizontal synchronizing signals HD are counted, on the basis of the leading edge timing t1 of the modulated trigger signal MTRIG supplied to the terminal C4. The gate signal GATE generated by the gate signal generator 312 is supplied to the switch circuit 313.

The switch circuit 313 is supplied with a high-speed horizontal synchronizing signal Hi-HD having a frequency twice to seven times that of the horizontal synchronizing frequency $f_H$ of the standard television system through the terminal C4 from the imaging control device 320. The switch circuit 313 selects the high-speed horizontal synchronizing signal Hi-HD only during the period T3 in which the gate signal GATE has the logic "H", and selects the modulated horizontal synchronizing signal TG-HD supplied from the sub-synchronizing signal generator 311B during the periods other than the period T3. The high-speed horizontal synchronizing signal Hi-HD and a modulated horizontal synchronizing signal TG-HD' as shown in FIG. 20G made of the modulated horizontal synchronizing signal TG-HD selected by the switch circuit 313 are supplied to the timing generator 315.

On the basis of the modulated vertical synchronizing signal TG-VD supplied from the sub-synchronizing signal generator 311B and the high-speed horizontal synchronizing signal Hi-HD and the modulated horizontal synchronizing signal TG-HD' selected by the switch circuit 313, the timing generator 315 generates various timing signals necessary for driving the CCD image sensor 317 and supplies these various timing signals to the CCD driving section 316.

The CCD driving section 316 generates a sensor gate signal SG shown in FIG. 20E, a reset signal, and driving pulses, such as, a horizontal transfer pulse and a vertical transfer pulse, based on the various timing signals and the electronic shutter control signal X-SUB, so as to drive the CCD image sensor 317.

The CDS circuit 318 carries out so-called correlated double sampling based on the sampling pulse supplied from the timing generator 315, with respect to the imaging signal read by two-line simultaneous reading from the CCD image sensor 317. Thus, the CDS circuit 318 takes out information components of the imaging signal and removes noise, such as, reset noise, included in the imaging signal.

The processing section 319 carries out predetermined processing, such as, gamma correction, of the imaging signal supplied from CDS circuit 318. A video signal VIDEO as shown in FIG. 20H outputted from the processing section 319 is supplied through a terminal C5 to the imaging control device 320.

Figure 21:
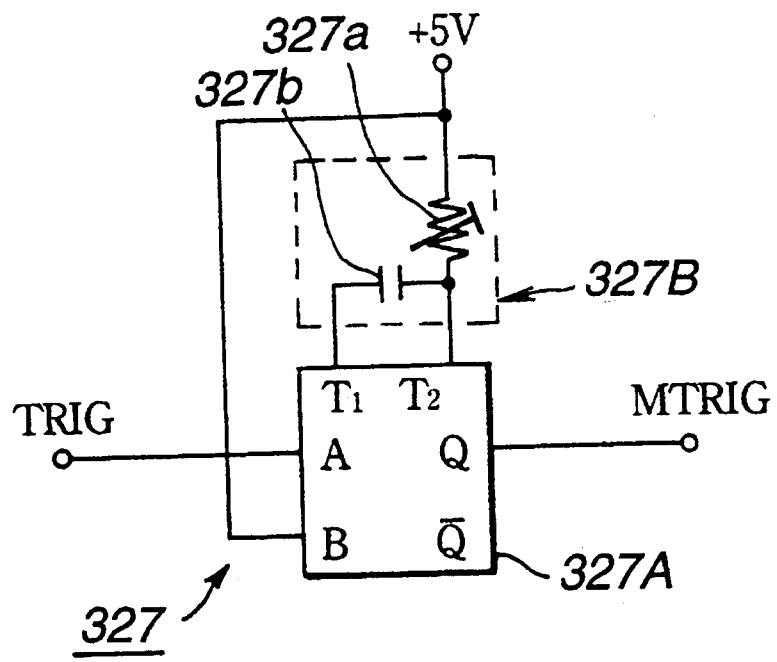
FIG. 21 is a circuit diagram showing a specific example of the structure of a pulse width variable setting section in an imaging control device used in the imaging system.
Figure 22:
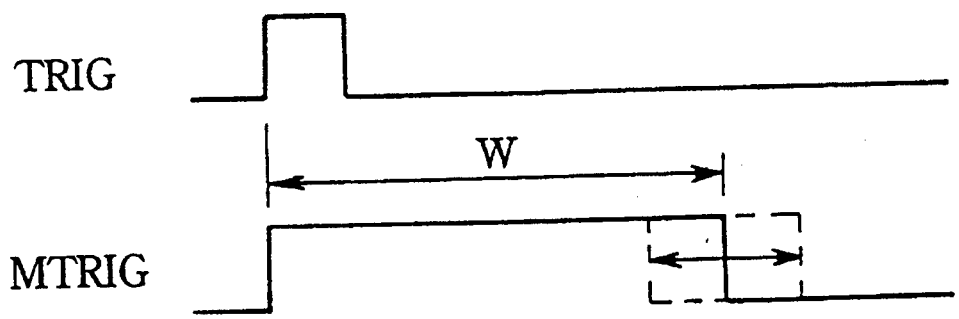
FIG. 22 is a time chart showing the operation of the pulse width variable setting section.

The imaging control device 320 has a memory 321 supplied with the video signal VIDEO obtained by the imaging device 310 through a terminal C51, and a memory controller 322 for controlling writing/reading of data to/from the memory 321. This imaging control device 320 also has a synchronizing signal generator 323, a sub-synchronizing signal generator 324, a high-speed horizontal synchronizing signal generator 325, a master clock generator 326, and a pulse width variable setting section 327. A trigger signal TRIG obtained as a detection output of the object sensor 303 is supplied to the pulse width variable setting section 327 through a terminal C20. This pulse width variable setting section 327 is adapted for arbitrarily carrying out variable setting of the pulse width of the trigger signal TRIG supplied to the terminal C20. The pulse width variable setting section 327 includes a mono-multivibrator 327A, and a time constant circuit 327B composed of a pre-set resistor 327a connected to the mono-multivibrator 327A and a capacitor 327b, as shown in a specific example of the structure of FIG. 21. As the mono-multivibrator 327A is triggered by the trigger signal TRIG from the object sensor 303, the pulse width variable setting section 327 generates a modulated trigger pulse signal MTRIG having a pulse width W corresponding to the time constant of the time constant circuit 327B, as shown in FIG. 22. The pulse width W of the modulated trigger signal MTRIG corresponding to the time constant of the time constant circuit 327B may be continuously variably set by the pre-set resistor 327a.

The modulated trigger signal MTRIG is supplied to the memory controller 322 and the sub-synchronizing signal generator 324, and is also supplied to the imaging device 310 through a terminal C41.

In this imaging control device 320, the synchronizing signal generator 323 generates synchronizing signals VD, HD based on the master clock MCK of about 28.6 MHz supplied from the master clock generator 326, and generates a 2FH signal having a frequency twice the frequency of the horizontal synchronizing signal HD and a CL/4 signal formed by carrying out frequency division of the master clock MCK to ¼. The synchronizing signals VD, HD generated by the synchronizing signal generator 323 are supplied to the memory controller 322. Also, the vertical synchronizing signal VD and the 2FH signal are supplied to the sub-synchronizing signal generator 324. The CL/4 signal is supplied to the high-speed horizontal synchronizing signal generator 325. In addition, the horizontal synchronizing signal HD is supplied as an external synchronizing signal EXT-HD through a terminal C21 to the imaging device 310.

Figure 23:
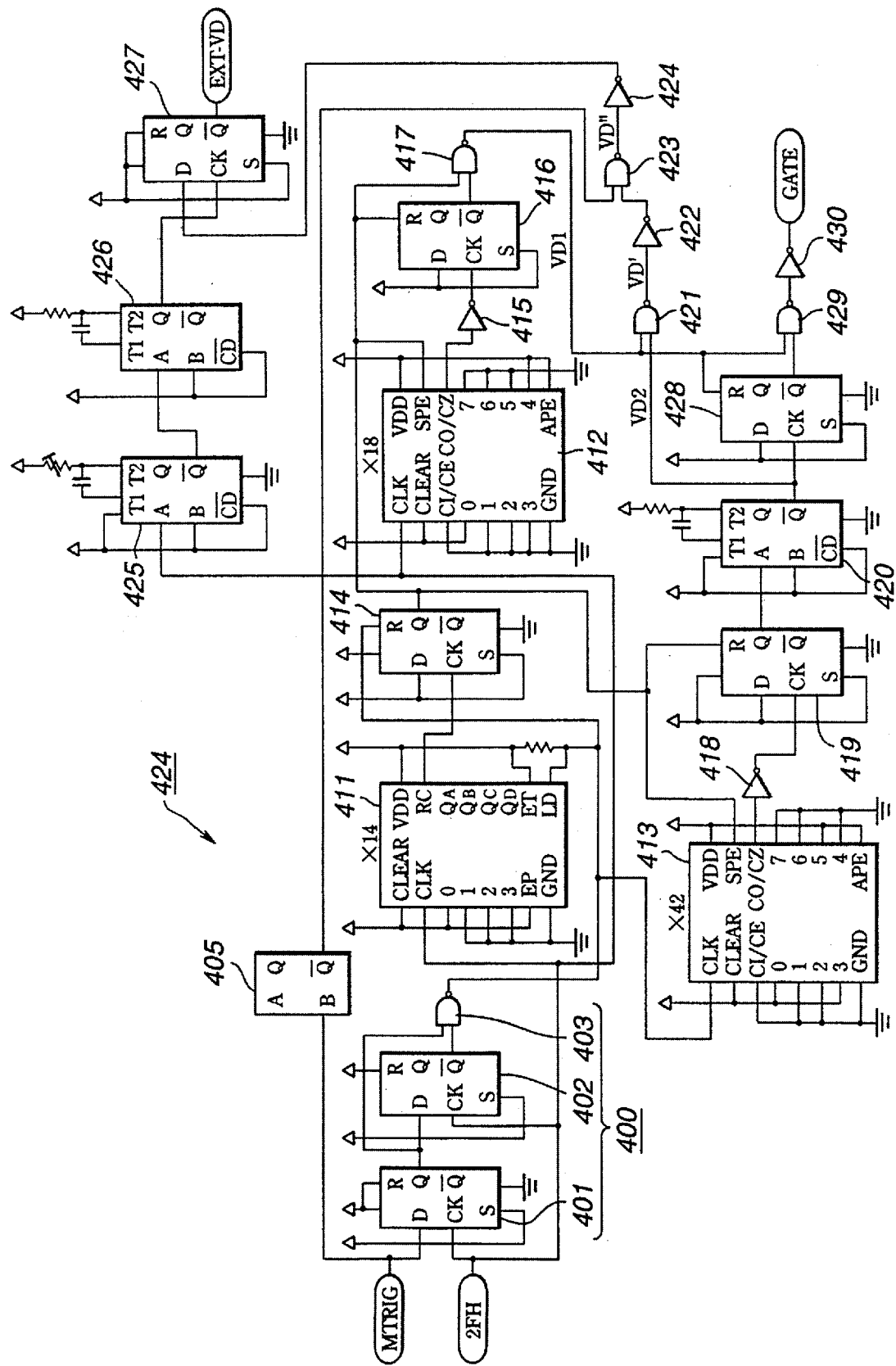
FIG. 23 is a circuit diagram showing the specific structure of a sub-synchronizing signal generator in the imaging control device used in the imaging system.

The sub-synchronizing signal generator 324 is adapted for generating an external synchronizing signal EXT-VD to be supplied to the imaging device 310 from the modulated trigger signal MTRIG, the vertical synchronizing signal VD and the 2FH signal, and has a structure as shown in FIG. 23.

The sub-synchronizing signal generator 324 shown in FIG. 23 has an edge detection circuit 400 which is supplied with the modulated trigger signal MTRIG and the 2FH signal, and first to third counters 411, 412, 413 with their respective clock input terminals CLK supplied with the 2FH signal.

The edge detection circuit 400 includes first and second D-flip-flops 401, 402 with their respective clock input terminals CK supplied with the 2FH signal, and a NAND gate 403 which is supplied with a non-inversion output of the first D-flip-flop 401 and an inversion output of the second D-flip-flop 402. The modulated trigger signal MTRIG is supplied to a data input terminal D of the first D-flip-flop 401, and a non-inversion output of the first D-flip-flop 401 is supplied to a data input terminal D of the second D-flip-flop 402. The edge detection circuit 400 of such structure detects the leading edge of the modulated trigger signal MTRIG. A detection output of the edge detection circuit 400 is supplied to a load terminal LD of the first counter 411 and is also supplied to a reset terminal R of a D-flip-flop 414.

The first counter 411 is a 4-bit binary counter for performing count-up operation at the leading edge of the 2FH signal. As the detection output of the edge detection circuit 400 is supplied to the load terminal LD, [1000] is preset every leading edge of the modulated trigger signal MTRIG, and count-up is carried out every leading edge of the 2FH signal so as to supply a carry output RC thereof to a clock input terminal CK of the D-flip-flop 414.

In the D-flip-flop 414, a data input terminal D is provided with the logic "H". As the detection output of the edge detection circuit 400 is supplied to the reset terminal R, the D-flip-flop 414 is reset every leading edge of the modulated trigger signal MTRIG, and the logic "H" of the data input terminal D is latched with reference to the carry output RC of the first counter 411 as a clock. A non-inversion output thereof is supplied to each of control input terminals SPE of the second and third counters 412, 413, and is also supplied to reset terminals R of the D-flip-flops 416, 419.

The second counter 412 is an 8-bit binary programmable down-counter. During a period when the control input terminal SPE thereof has the logic "L", that is, during a period until the D-flip-flop 414 is reset at the timing t1 of the leading edge of the modulated trigger signal MTRIG so as to output the logic "H" by the carry output RC of the first counter 411, [10001000] is preset at the timing of the leading edge of the 2FH signal. After that, when the control input terminal SPE has the logic "H", the second counter 412 carries out count-down every leading edge of the 2FH signal, and supplies a count output CO/CZ through an inverter 415 of a NAND gate to a clock input terminal CK of the D-flip-flop 416.

In the D-flip-flop 416, a data input terminal D is provided with the logic "H". As the output of the D-flip-flop 414 is supplied to the reset terminal R, the D-flip-flop 416 is reset every leading edge of the output of the D-flip-flop 414, and the logic "H" of the data input terminal D is latched with reference to an inversion signal of the count output CO/CZ of the second counter 412 as a clock. An inversion output thereof is supplied to one input terminal of a NAND gate 417.

In this NAND gate 417, the other input terminal is supplied with a non-inversion output of the D-flip-flop 414. As a NAND output of the non-inversion output of the D-flip-flop 414 and the inversion output of the D-flip-flop 416, the NAND gate 417 generates a first vertical synchronizing signal VD1 as shown in FIG. 24B which has the logic "L" only during a 9H period after the lapse of 7H from the timing t1 of the leading edge of the modulated trigger signal MTRIG shown in FIG. 24A.

The output of the NAND gate 417, that is, the first vertical synchronizing signal VD1, is supplied to one input terminal of each of NAND gates 421, 429, and is also supplied to a reset terminal R of a D-flip-flop 428.

The third counter 413 is an 8-bit binary programmable down-counter. During a period when the control input terminal SPE thereof has the logic "L", that is, during a period until the D-flip-flop 414 is reset at the timing t1 of the leading edge of the modulated trigger signal MTRIG so as to output the logic "H" by the carry output RC of the first counter 411, [10010100] is preset at the timing of the leading edge of the 2FH signal. After that, when the control input terminal SPE has the logic "H", the third counter 413 carries out count-down every leading edge of the 2FH signal, and supplies a count output CO/CZ through an inverter 418 of a NAND gate to a clock input terminal CK of the D-flip-flop 419.

In the D-flip-flop 419, a data input terminal D is provided with the logic "H". As the output of the D-flip-flop 414 is supplied to the reset terminal R, the D-flip-flop 419 is reset every leading edge of the output of the D-flip-flop 414, and the logic "H" of the data input terminal D is latched with reference to an inversion signal of the count output CO/CZ of the third counter 413 as a clock. A non-inversion output thereof is supplied to a trigger terminal A of a monostable multivibrator 420.

As the monostable multivibrator 420 is triggered by the non-inversion output of the D-flip-flop 419, the monostable multivibrator 420 generates, as an inversion output thereof, a second vertical synchronizing signal VD2 which has the logic "L" only during a 9H period after the lapse of 28H form the timing t1 of the leading edge of the modulated trigger signal MTRIG, as shown in FIG. 24C.

The inversion output of the monostable multivibrator 420, that is, the second vertical synchronizing signal VD2, is supplied to the other input terminal of the NAND gate 421 and is also supplied to a clock input terminal CK of the D-flip-flop 428.

The NAND gate 421 supplies a NAND output of the first vertical synchronizing signal VD1 supplied from the NAND gate 417 and the second vertical synchronizing signal VD2 supplied form the monostable multivibrator 420, as a signal VD' as shown in FIG. 24D, to one input terminal of a NAND gate 423 through an inverter 422 of a NAND gate.

The NAND gate 423 is supplied, at its other input terminal, with a pulse signal outputted from a monostable multivibrator 405 triggered at a timing t5 of the leading edge of the modulated trigger signal MTRIG, and generates a signal VD" as shown in FIG. 24E as a NAND output of the pulse signal and the signal VD'. The signal VD" generated by the NAND gate 423 is supplied to a data input terminal D of a D-flip-flop 427 through an inverter 424 of a NAND gate.

The D-flip-flop 427 is supplied, at a clock input terminal CK thereof, with a clock signal generated by performing phase adjustment of the 2FH signal by two stages of monostable multivibrators 425, 426. With this clock signal, the D-flip-flop 427 latches the signal VD".

The sub-synchronizing signal generator 324 supplies the latch output generated by the D-flip-flop 427 as an external synchronizing signal EXT-VD to the imaging device 310 through a terminal C11.

In addition, in this sub-synchronizing signal generator 324, the D-flip-flop 428 is provided with the logic "H" at its data input terminal D, and is reset at the leading edge of the first vertical synchronizing signal VD1 supplied from the NAND gate 417. The D-flip-flop 428 then latches the logic "H" at the data input terminal D with reference to the second vertical synchronizing signal VD2 supplied from the monostable multivibrator 420 as a clock, and supplies its inversion output to the other input terminal of the NAND gate 429.

The NAND gate 429 supplies a NAND output of the first vertical synchronizing signal VD1 supplied from the NAND gate 417 and the inversion output of the D-flip-flop 428, as a gate signal GATE, to the high-speed horizontal synchronizing signal generator 325 through an inverter 430 of a NAND gate. The gate signal GATE has, as shown in FIG. 24F, the logic "H" only during a period T3 of 21H from the timing of the leading edge of the first vertical synchronizing signal VD1 to the timing of the leading edge of the second vertical synchronizing signal VD2.

The high-speed horizontal synchronizing signal generator 325 is adapted for generating, from the CL/4 signal, a high-speed horizontal synchronizing signal Hi-HD to be supplied to the imaging device 310, and has a structure similar to that of the high-speed horizontal synchronizing signal generator 125 shown in FIG. 17.

The memory 321 is controlled in writing/reading of data by the memory controller 322 on the basis of the modulated trigger signal MTRIG and the synchronizing signals VD, HD. The memory 321 takes in the video signal VIDEO supplied through the terminal C51, and supplies this video signal VIDEO as a still picture signal to the image processor from the terminal C52.

In the imaging control device 320 of such structure, the horizontal synchronizing signal HD in conformity to the CCIR system generated by the synchronizing signal generator 323 is supplied as an external horizontal synchronizing signal EXT-HD to the imaging device 310. When the object sensor 303 detects the detection object 302 on the transfer path 301 and generates a trigger signal TRIG, the trigger signal TRIG is supplied to the imaging device 310. At the same time, an external synchronizing signal EXT-VD, generated by inserting the first vertical synchronizing signal VD I having the logic "L" only during the 9H period after the lapse of 7H from the timing t1 of the leading edge of the trigger signal TRIG and the second vertical synchronizing signal VD2 having the logic "L" only during the 9H period after the lapse of 7H into the vertical synchronizing signal VD of the standard television system, is supplied from the sub-synchronizing signal generator 324 to the imaging device 310. In addition, a high-speed horizontal synchronizing signal Hi-HD having a frequency twice to seven times that of the horizontal synchronizing signal HD is supplied from the high-speed horizontal synchronizing signal generator 325 to the imaging device 310.

In the imaging device 310, on the basis of the external synchronizing signals EXT-VD, EXT-HD, the high-speed horizontal synchronizing signal Hi-HD and the modulated trigger signal MTRIG supplied from the imaging control device 320, imaging is carried out in response to the modulated vertical synchronizing signal TG-VD and the shutter control signal X-SUB generated by the sub-synchronizing signal generator 311B, the high-speed horizontal synchronizing signal Hi-HD selected by the switch circuit 313, and the modulated horizontal synchronizing signal TG-HD' constituted by the modulated horizontal synchronizing signal TG-HD.

The CCD image sensor 317 in the imaging device 310 requires about 8.3 $\mu$s for one cycle of its vertical transfer operation, that is, for sending one packet of imaging charges. The allowable number of cycles of the vertical transfer operation in the 1H period, that is, in 63.556 $\mu$s, is limited to 7.66, that is, 7 cycles. Therefore, the frequency of the high-speed horizontal synchronizing signal Hi-HD is caused to be a frequency twice to seven times that of the horizontal synchronizing signal HD.

Since the period T3 during which the high-speed horizontal synchronizing signal Hi-HD is inserted is 21H, the vertical transfer cycle in the period T3 is 21×2=42 cycles when the frequency of the high-speed horizontal synchronizing signal Hi-HD is $2f_H$, and 21×7=147 cycles when the frequency of the high-speed horizontal synchronizing signal Hi-HD is $7f_H$.

Figure 25:
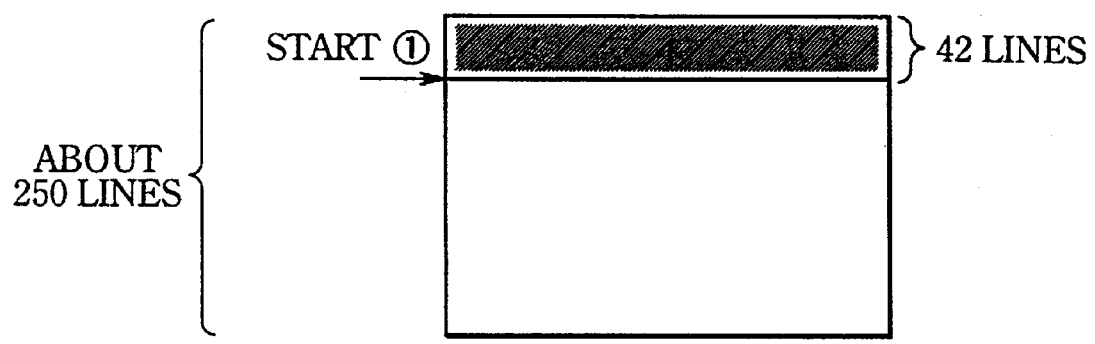
FIG. 25 is a view for explaining the principle for varying a read start position of an image imaged by the CCD image sensor in the imaging device.

Specifically, when the frequency of the high-speed horizontal synchronizing signal Hi-HD is $2f_H$, 42 lines of the upper part of the imaging surface of the CCD image sensor 317 are read out during the period T3, as indicated by slant lines in FIG. 25. Since reading of the above-described 42 lines is completed on completion of the period T3, the cycle returns to the normal cycle and normal imaging signals are read out from a line of start.

Figure 26:
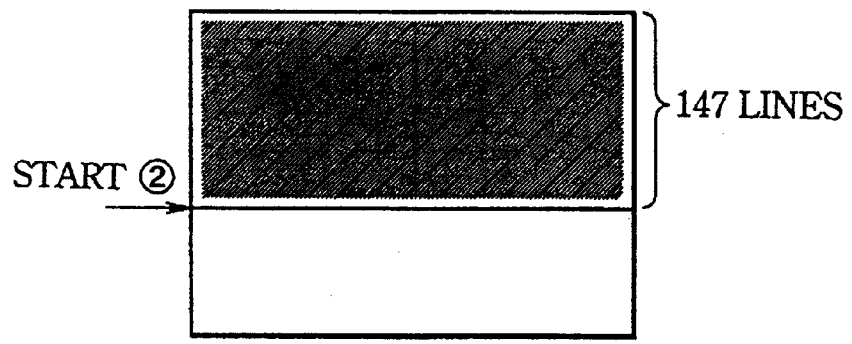
FIG. 26 is also a view for explaining the principle for varying the read start position of an image.

On the other hand, when the frequency of the high-speed horizontal synchronizing signal Hi-HD is $7f_H$, 147 lines of the upper part of the imaging surface of the CCD image sensor 317 are read out during the period T3, as indicated by slant lines in FIG. 26. Since reading of the above-described 147 lines is completed on completion of the period T3, the cycle returns to the normal cycle and normal imaging signals are read out from a line of start.

Thus, by varying the frequency of the high-speed horizontal synchronizing signal Hi-HD, the position of an image to be imaged may be freely set.

That is, in the imaging device 310, sweeping of electric charges to a charge sweeping section of the interline transfer type CCD image sensor 317 having the electronic shutter function is stopped for the predetermined time period T1 in response to the modulated trigger signal MTRIG generated on the basis of the trigger signal TRIG, and after the lapse of the predetermined time period T1, the imaging charges stored in the light-receiving section are read out as effective charges to the vertical transfer section VREG. After the imaging charges read out to the vertical transfer section VREG are vertically transferred at a high speed only for a predetermined number of transfer cycles, vertical transfer corresponding to the standard television system is carried out until the timing t5 of the trailing edge of the modulated trigger signal MTRIG. Then, the effective charges from which the predetermined number of lines of imaging charges have been removed by the high-speed vertical transfer are outputted as imaging signals of the number of lines corresponding to the pulse width of the modulated trigger signal MTRIG, through the horizontal transfer section HREG by vertical transfer corresponding to the standard television system. Thus, by utilizing the electronic shutter function of the interline transfer type CCD image sensor 317, imaging by high-speed random shutter synchronized with the trigger signal TRIG may be carried out so as to obtain necessary effective charges after the predetermined number of lines, as imaging signals.

In the high-speed horizontal synchronizing signal generator 325 of the imaging control device 320 in this imaging system, as the preset value to be supplied to the counter 251 as shown in FIG. 17 is changed by the setting circuit 252, the high-speed horizontal synchronizing signal Hi-HD having the frequency twice to seven times that of the horizontal synchronizing signal HD is generated and supplied to the imaging device 310, thus enabling free setting of a start horizontal line position of an image to be imaged.

Figure 24:
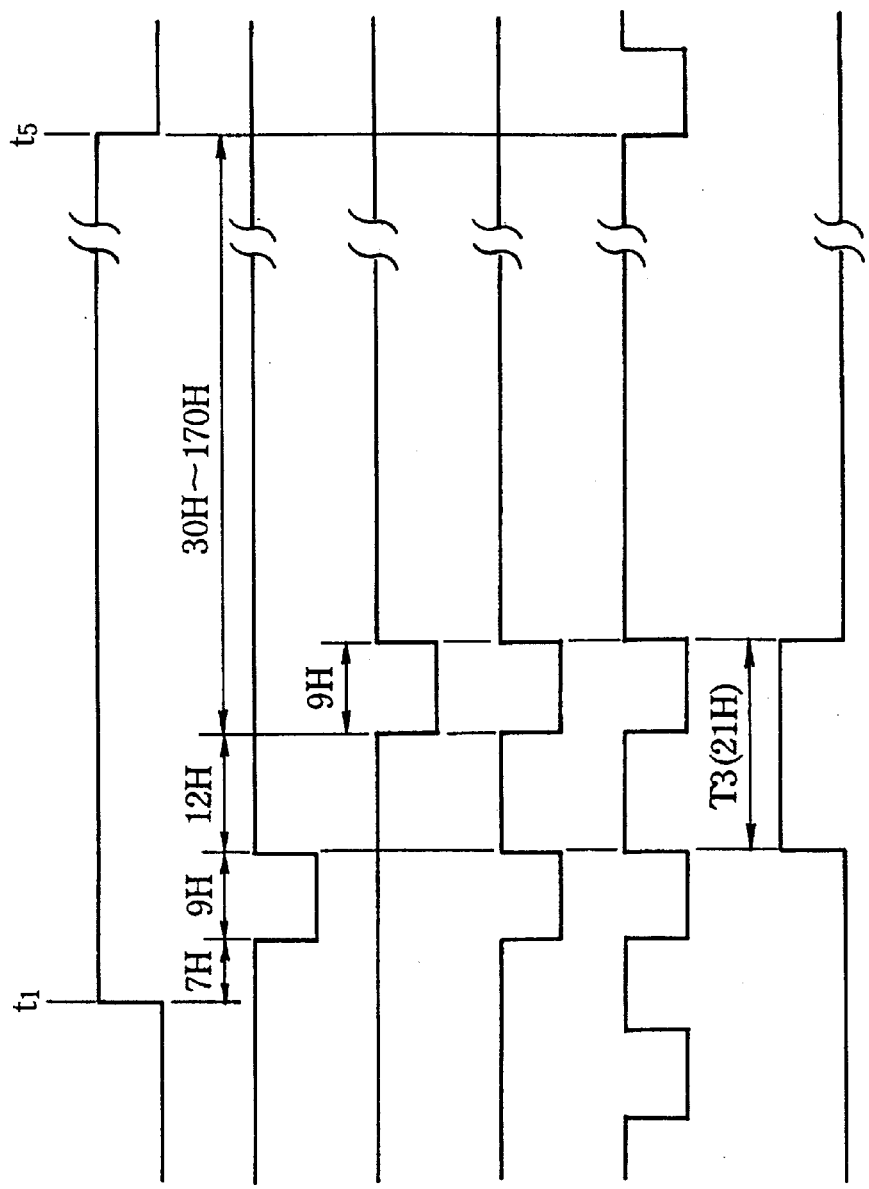
FIG. 24 is a timing chart showing the operation of the sub-synchronizing signal generator.

The size of the image to be imaged is determined by the trailing edge of the modulated trigger signal MTRIG indicating the image end timing t5 in FIG. 24. That is, the period from the trailing edge of the gate signal GATE to the trailing edge of the modulated trigger signal MTRIG becomes the image size.

Figure 27:
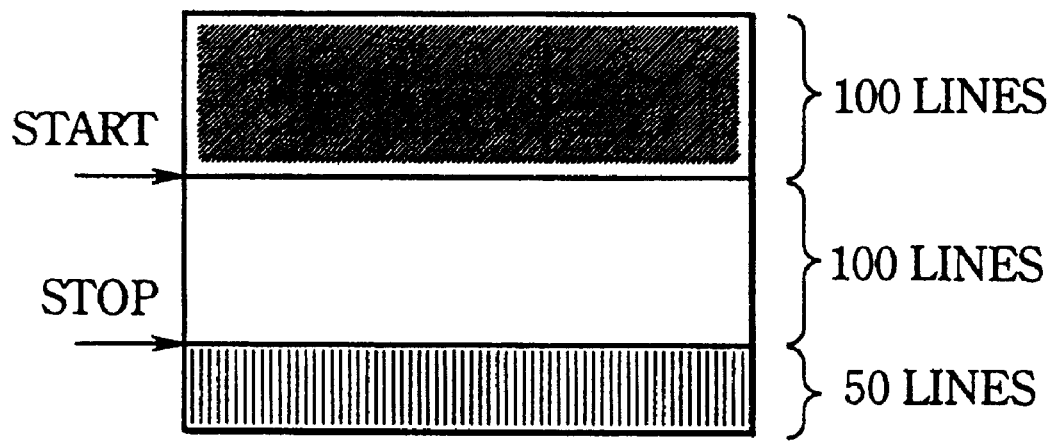
FIG. 27 is a view for explaining an image size of an imaging signal read out from the CCD image sensor in the imaging device.

In the case where 100 lines are transferred during the period T3 of the gate signal GATE so as to have an image size of 100 lines, as shown in FIG. 27, approximately 50 lines are left as transfer residuals at the image output timing. However, since the transfer residual lines are transferred in a state of overlapping the first 100 lines of the period T3 of the next gate signal GATE, image signals of the portion to be imaged are not affected.

Figure 28:
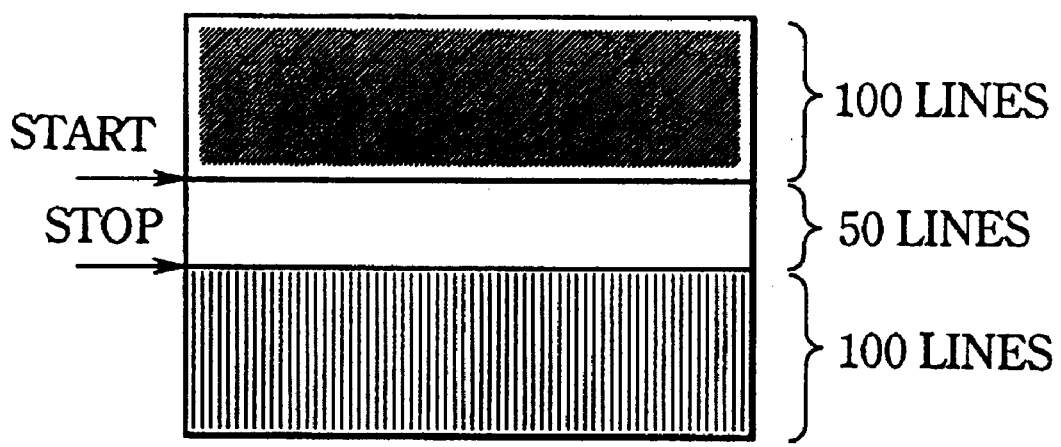
FIG. 28 is also a view for explaining the image size.

The number of lines such that the transfer residuals does not affect the image signals of the portion to be imaged is determined by the number of transfer cycles of the period T3 of the gate signal GATE. Such number of lines is up to 100 in the case where 100 lines are transferred during the period T3 of the gate signal GATE. That is, the image size may be reduced to 50 lines, as shown in FIG. 28.

Therefore, in accordance with the setting of the pulse width of the modulated trigger signal MTRIG indicating the image end timing, the image size may be freely set within the range of 50 to 150 lines.

Figure 29:
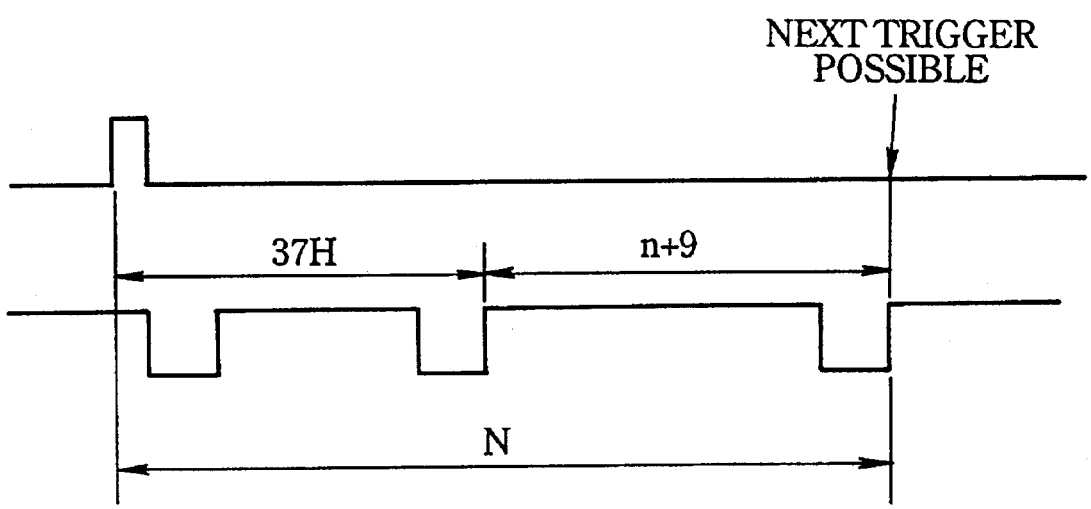
FIG. 29 is a view for explaining a trigger cycle of imaging operation by the imaging device.

On the other hand, the trigger cycle is determined by the vertical synchronizing signal VD indicating the image end timing, and may be reduced to immediately after the timing of the vertical synchronizing signal VD. If n=1, imaging operation may be carried out with a cycle of 1/5.6 in comparison with the cycle (262.5 lines: EIA) in the standard television system with respect to N=47 lines, as shown in FIG. 29.

The setting of two vertical synchronizing signals VD after the trigger corresponds to the operation of the actual integrated circuit in terms of the structure of the sub-synchronizing signal generator.

Figure 30B:
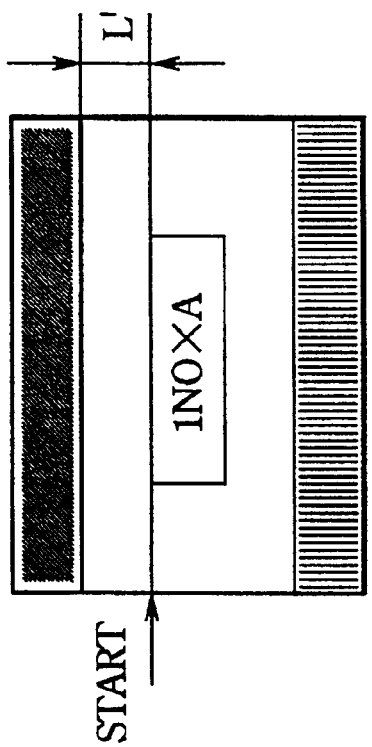
FIG. 30 is a view showing a state that the position of a detection object imaged by the imaging device is shifted on the screen.
Figure 30A:
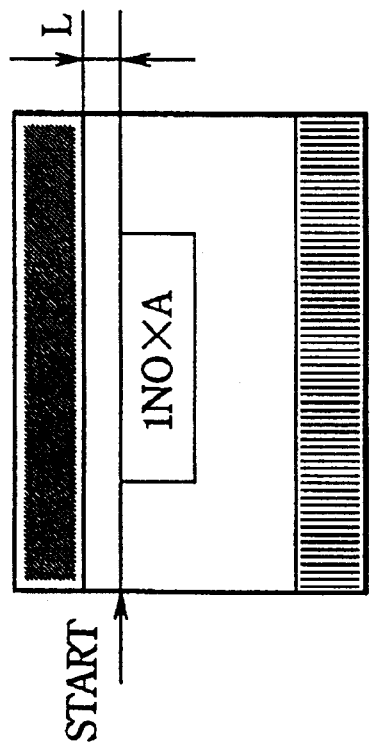
Figure 31A:
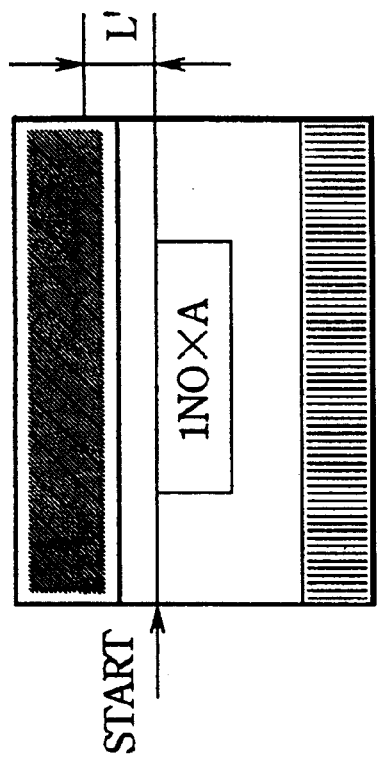
FIG. 31 is a view showing a state that the position, shifted on the screen, of the detection object imaged by the imaging device is automatically corrected to be outputted at the same timing.
Figure 31B:
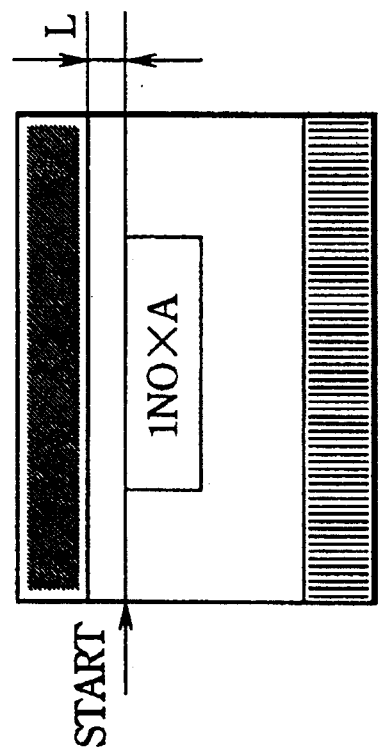

In this imaging system, since the start horizontal line position of the image to be imaged may be freely set by varying the frequency of the high-speed horizontal synchronizing signal Hi-HD as described above, the detection object 302 such that the position L≠L' on the screen fluctuates as shown in FIGS. 30A and 30B may be automatically corrected to obtain L=L' so that the object may be outputted constantly at the same timing on the image signal as shown in FIGS. 31A and 31B.

Figure 32:
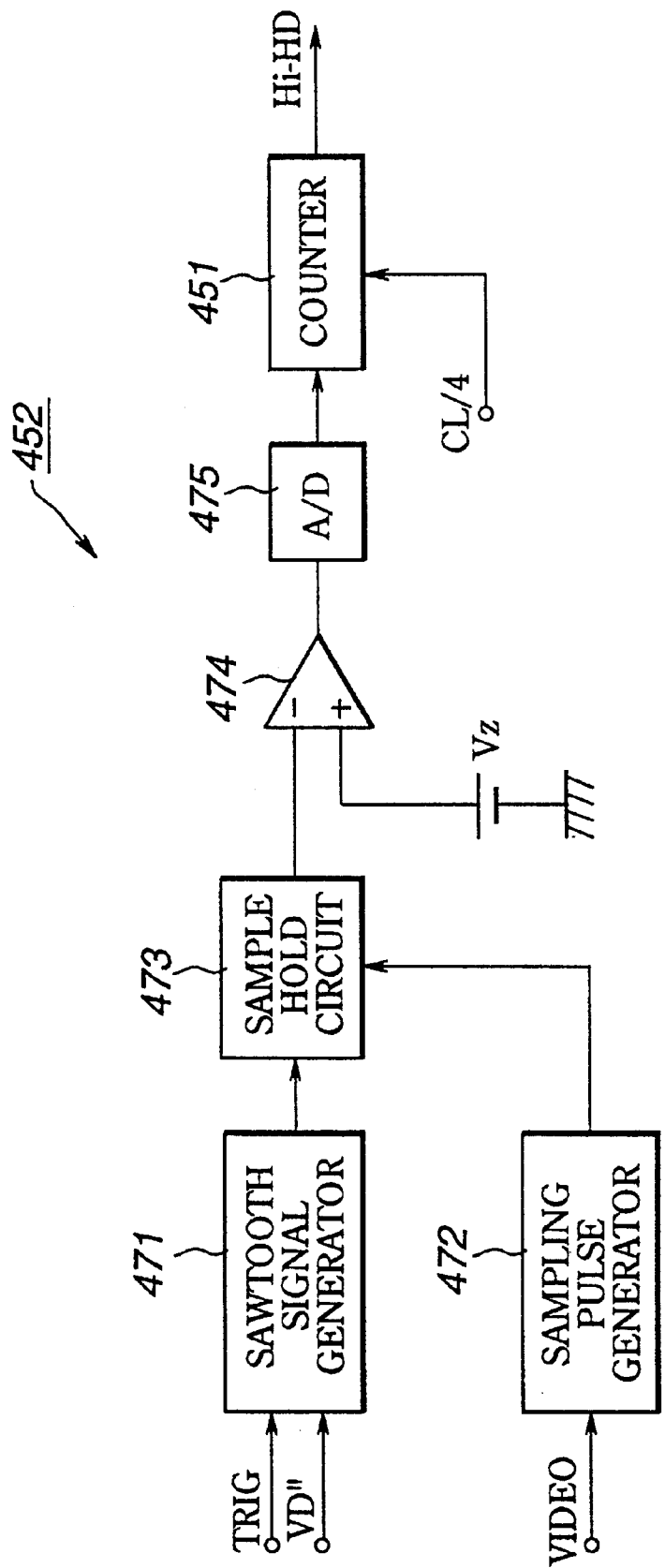
FIG. 32 is a block diagram showing the structure of a setting circuit of a high-speed horizontal synchronizing signal generator having a function to perform the automatic correction.

To realize this, a setting circuit 452 of the structure as shown in FIG. 32 may be used in place of the setting circuit 252 which sets the preset value of the counter 251 by manual operation in the high-speed horizontal synchronizing generator 325 of the image control device 320.

The setting circuit 452 shown in FIG. 32 includes a sawtooth signal generator 471, a sampling pulse generator 472, a sample hold circuit 473, a voltage comparator 474, and an A/D converter 475.

Figure 33:
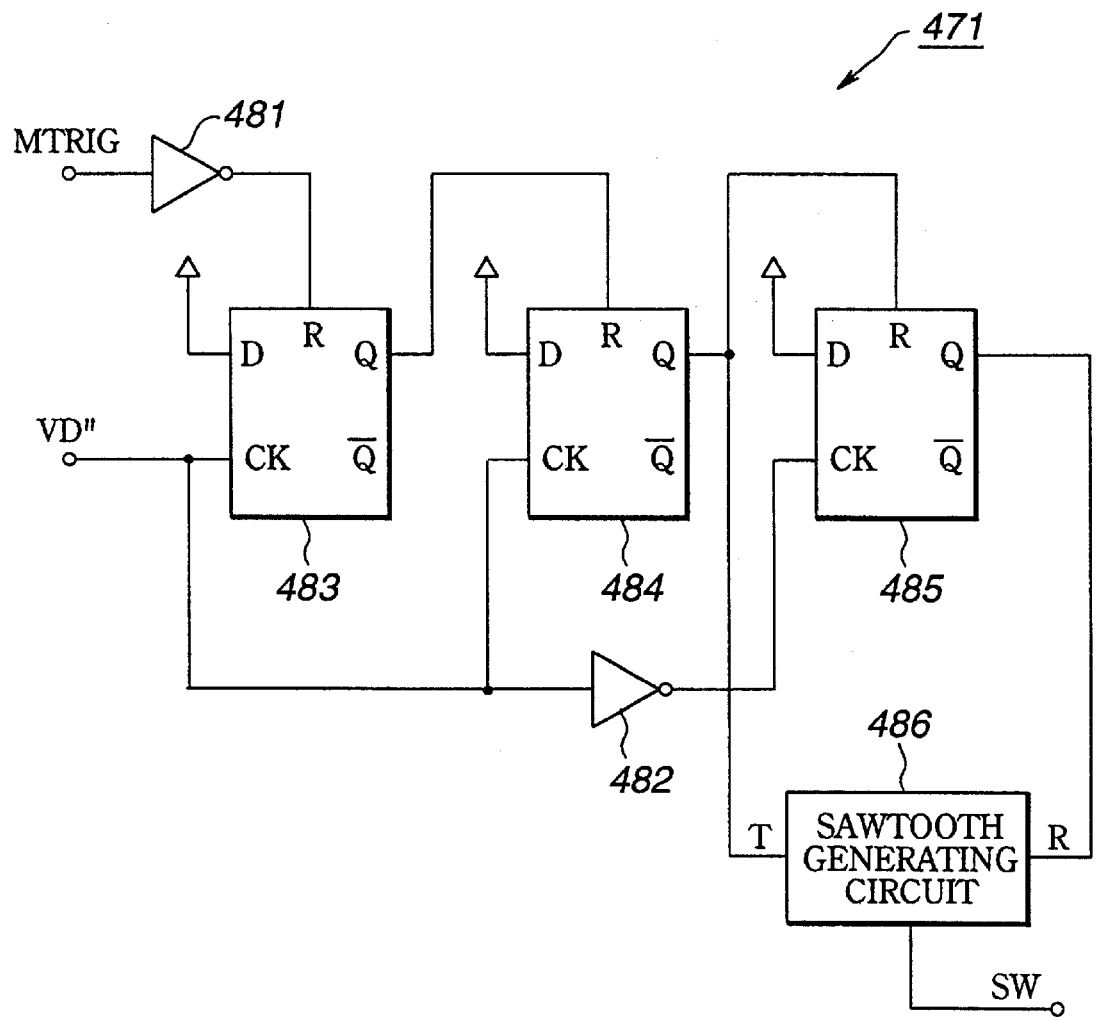
FIG. 33 is a circuit diagram showing the structure of a sawtooth generator of the setting circuit.

The sawtooth signal generator 471 is constituted by inverters 481, 482, D-flip-flop circuits 483, 484, 485, and a sawtooth generating circuit 486, as shown in FIG. 33. In this sawtooth signal generator 471, a modulated trigger signal MTRIG as shown in FIG. 34A is supplied to a reset terminal R of the D-flip-flop circuit 483 through the inverter 481, and a vertical synchronizing signal VD" as shown in FIG. 34B is supplied to each of clock terminals CK of the D-flip-flop circuits 483, 484. The vertical synchronizing signal VD" is also supplied to a clock terminal CK of the D-flip-flop circuit 485 through the inverter 482. The D-flip-flop circuits 483, 484, 485 are supplied with power of the logic "H" at their respective data terminals. An output terminal Q of the D-flip-flop circuit 483 is connected to a reset terminal of the D-flip-flop circuit 484, and an output terminal Q of the D-flip-flop circuit 484 is connected to a reset terminal R of the D-flip-flop circuit 485 and a trigger terminal T of the sawtooth generating circuit 486. An output terminal Q of the D-flip-flop circuit 485 is connected to a reset terminal R of the sawtooth generating circuit 486.

In the sawtooth signal generator 471 of such structure, a sawtooth signal SW as shown in FIG. 34C over the entire imaging period corresponding to the image size is generated on the basis of the vertical synchronizing signal VD" every time the modulated trigger signal MTRIG is supplied. The sawtooth signal SW generated by the sawtooth signal generator 471 is supplied to the sample hold circuit 473.

When supplied with a video signal as shown in FIG. 34D, the sampling pulse generator 472 detects the edge of the image signal of the detection object with respect to the video signal, thereby generating a sampling pulse SP as shown in FIG. 34E which indicates the position of the detection object 302 within the frame of the imaged picture. The sampling pulse SP generated by the sampling pulse generator 472 is supplied to the sample hold circuit 473.

The sample hold circuit 473 samples and holds the sawtooth signal supplied from the sawtooth signal generator 471 by the sampling pulse SP supplied from the sampling pulse generator 472. The hold output of the sample hold circuit 472 is supplied to the voltage comparator 474.

The voltage comparator 474 compares the hold output from the sample hold circuit 473 with a reference voltage Vz. The comparison output from the voltage comparator 474 is supplied to the A/D converter 475.

The A/D converter 475 converts the signal level of the comparison output from the voltage comparator 474 to an 8-bit digital value, and supplies this digital value as a preset value to the counter 251 of the high-speed horizontal synchronizing signal generator 325.

In the setting circuit 452 of such structure, if the timing of the detection object 302 is too early from the start of imaging, the voltage of the hold output of the sample hold circuit 473 is lowered and the comparison output of the voltage comparator 474 is increased. As the 8-bit digital value obtained by digitizing the signal level of the comparison output of the voltage comparator 474 by the A/D converter 475 is preset as the preset value of the counter 251 of the high-speed horizontal synchronizing signal generator 325, the phase of the detection object is delayed from the imaging start timing and becomes closer to the center of the sawtooth signal SW. On the contrary, when the timing of the detection object 302 is too late from the start of imaging, the voltage of the hold output of the sample hold circuit 473 is increased and the comparison output of the voltage comparator 474 is lowered. As the 8-bit digital value obtained by digitizing the signal level of the comparison output of the voltage comparator 474 by the A/D converter 475 is preset as the preset value of the counter 251 of the high-speed horizontal synchronizing signal generator 325, the phase of the detection object becomes closer to the imaging start timing and closer to the center of the sawtooth signal SW.

Therefore, by setting the reference voltage Vz provided for the voltage comparator 475 to a voltage obtained at the center of the sawtooth signal SW, the detection object may be constantly brought to the center of the image signal by the setting circuit.

By thus preparing the sampling pulse SP utilizing a part of the image signal, then detecting the position of the detection object 302 in the imaging section, and thus controlling the frequency of the high-speed horizontal synchronizing signal Hi-HD in the gate period T3, the detection object 302 may be automatically corrected so that it is outputted constantly at the same timing on the image signal.

We claim:

1. An imaging control method for an imaging device having an interline transfer type solid-state imaging element, the solid-state imaging element having a light-receiving section in which plural light-receiving elements, each generating and storing electric charges corresponding to the quantity of incident light, are arranged in a matrix, a vertical transfer section for transferring the electric charges read out from each of the light-receiving elements, and a horizontal transfer section for outputting the electric charges transferred through the vertical transfer section, the method comprising the steps of:

(a) generating a standard vertical synchronizing signal and a standard horizontal synchronizing signal in conformity to the standard television system;

(b) generating a trigger signal on the basis of the standard vertical synchronizing signal;

(c) eliminating all electric charges stored in the plural light-receiving elements as ineffective charges at a first timing corresponding to the trigger signal, reading out the electric charges stored in the plural light-receiving elements to the vertical transfer section at a second timing after a predetermined time from the first timing, vertically transferring the electric charges transferred to the vertical transfer section at a first transfer speed during a first period from the second timing to a third timing, and vertically transferring the electric charges of the vertical transfer section at a second transfer speed which is lower than the first transfer speed and corresponding to the standard television system during a second period from the third timing to a fourth timing which is the timing of next trigger signal, thus controlling the interline transfer type solid-state imaging element so that one frame of image information is outputted every cycle of the trigger signal through the vertical transfer section;

(d) temporarily storing the image information outputted from the interline transfer type solid-state imaging element during plural cycles of the trigger signal;

(e) reading out the stored plural frames of image information as one frame of output image information at a speed based on the standard vertical synchronizing signal and the standard horizontal synchronizing signal; and (f) appending the standard vertical synchronizing signal and the standard horizontal synchronizing signal of the standard television system to read out one frame of output image information.

2. The imaging control method as claimed in claim 1, wherein a standard vertical synchronizing signal and a standard horizontal synchronizing signal in conformity to the CCIR (International Radio Consultative Committee) system are generated at step (a).

3. An imaging control device for an imaging device having an interline transfer type solid-state imaging element, the solid-state imaging element having a light-receiving section in which plural light-receiving elements, each generating and storing electric charges corresponding to the quantity of incident light, are arranged in a matrix, a vertical transfer section for transferring the electric charges read out from each of the light-receiving elements, and a horizontal transfer section for outputting the electric charges transferred through the vertical transfer section, the imaging control device comprising:

synchronizing signal generating means for generating a standard vertical synchronizing signal and a standard horizontal synchronizing signal in conformity to the standard television system and outputting the standard horizontal synchronizing signal to the imaging device;

trigger signal generating means for generating a trigger signal on the basis of the standard vertical synchronizing signal and outputting the trigger signal to the imaging device;

imaging element control means for eliminating all electric charges stored in the plural light-receiving elements as ineffective charges at a first timing corresponding to the trigger signal, reading out the electric charges stored in the plural light-receiving elements to the vertical transfer section at a second timing after a predetermined time from the first timing, vertically transferring the electric charges transferred to the vertical transfer section at a first transfer speed during a first period from the second timing to a third timing, and vertically transferring the electric charges of the vertical transfer section at a second transfer speed which is lower than the first transfer speed and corresponding to the standard television system during a second period from the third timing to a fourth timing which is the timing of next trigger signal, thus controlling the interline transfer type solid-state imaging element so that one frame of image information is outputted every cycle of the trigger signal through the vertical transfer section;

storage means having a storage capacity to store plural frames of images and adapted for temporarily storing the image information outputted from the interline transfer type solid-state imaging element during plural cycles of the trigger signal;

read-out means for reading out the plural frames of image information stored in the storage means as one frame of output image information at a speed based on the standard vertical synchronizing signal and the standard horizontal synchronizing signal; and output means for appending the standard vertical synchronizing signal and the standard horizontal synchronizing signal of the standard television system to the one frame of output image information read out by the read-out means and outputting the resultant one frame of output image information.

4. The imaging control device as claimed in claim 3, wherein the imaging element control means includes sub-synchronizing signal generating means for generating a sub-vertical synchronizing signal providing a second timing based on the timing of the leading edge of the trigger signal as a reference and outputting the sub-vertical synchronizing signal to the imaging device, and high-speed horizontal synchronizing signal generating means for generating a high-speed horizontal synchronizing signal having a frequency twice the frequency of the standard horizontal synchronizing signal during the first period and outputting the high-speed horizontal synchronizing signal to the imaging device.

5. The imaging control device as claimed in claim 3, wherein the synchronizing signal generating means generates a standard vertical synchronizing signal and a standard horizontal synchronizing signal in conformity to the CCIR system, and the trigger signal generating means generates a trigger signal having a cycle ½ of the cycle of the standard vertical synchronizing signal.

6. An imaging system comprising an imaging device and an imaging control device, the imaging device comprising an interline transfer type solid-state imaging element, the solid-state imaging element having a light-receiving section in which plural light-receiving elements, each generating and storing electric charges corresponding to the quantity of incident light, are arranged in a matrix, a vertical transfer section for transferring the electric charges read out from each of the light-receiving elements, and a horizontal transfer section for outputting the electric charges transferred through the vertical transfer section, the imaging control device comprising:

synchronizing signal generating means for generating a standard vertical synchronizing signal and a standard horizontal synchronizing signal in conformity to the standard television system and outputting the standard horizontal synchronizing signal to the imaging device; trigger signal generating means for generating a trigger signal on the basis of the standard vertical synchronizing signal and outputting the trigger signal to the imaging device; imaging element control means for eliminating all electric charges stored in the plural light-receiving elements as ineffective charges at a first timing corresponding to the trigger signal, reading out the electric charges stored in the plural light-receiving elements to the vertical transfer section at a second timing after a predetermined time from the first timing, vertically transferring the electric charges transferred to the vertical transfer section at a first transfer speed during a first period from the second timing to a third timing, and vertically transferring the electric charges of the vertical transfer section at a second transfer speed which is lower than the first transfer speed and corresponding to the standard television system during a second period from the third timing to a fourth timing which is the timing of next trigger signal, thus controlling the interline transfer type solid-state imaging element so that one frame of image information is outputted every cycle of the trigger signal through the vertical transfer section; storage means having a storage capacity to store plural frames of images and adapted for temporarily storing the image information outputted from the interline transfer type solid-state imaging element during plural cycles of the trigger signal; read-out means for reading out the plural frames of image information stored in the storage means as one frame of output image information at a speed based on the standard vertical synchronizing signal and the standard horizontal synchronizing signal; and output means for appending the standard vertical synchronizing signal and the standard horizontal synchronizing signal of the standard television system to the one frame of output image information read out by the read-out means and outputting the resultant one frame of output image information.

7. The imaging system as claimed in claim 6, wherein the imaging element control means of the imaging control device includes sub-synchronizing signal generating means for generating a sub-vertical synchronizing signal based on the trigger signal as a reference and outputting the sub-vertical synchronizing signal to the imaging device, and high-speed horizontal synchronizing signal generating means for generating a high-speed horizontal synchronizing signal having a frequency twice the frequency of the standard horizontal synchronizing signal during the first period and outputting the high-speed horizontal synchronizing signal to the imaging device.

8. The imaging system as claimed in claim 6, wherein the imaging control device generates a standard vertical synchronizing signal and a standard horizontal synchronizing signal in conformity to the CCIR system by the synchronizing signal generating means.

9. An imaging device comprising:

an interline transfer type solid-state imaging element having a light-receiving section in which plural light-receiving elements, each generating and storing electric charges corresponding to the quantity of incident light, are arranged in a matrix, a vertical transfer section for transferring the electric charges read out from each of the light-receiving elements, and a horizontal transfer section for outputting the electric charges transferred through the vertical transfer section;

standard synchronizing signal generating means for generating a standard vertical synchronizing signal and a standard horizontal synchronizing signal in conformity to the standard television system;

trigger signal generating means for generating a trigger signal on the basis of the standard vertical synchronizing signal;

imaging element control means for eliminating all electric charges stored in the plural light-receiving elements as ineffective charges at a first timing corresponding to the trigger signal, reading out the electric charges stored in the plural light-receiving elements to the vertical transfer section at a second timing after a predetermined time from the first timing, vertically transferring the electric charges transferred to the vertical transfer section at a first transfer speed during a first period from the second timing to a third timing, and vertically transferring the electric charges of the vertical transfer section at a second transfer speed which is lower than the first transfer speed and corresponding to the standard television system during a second period from the third timing to a fourth timing which is the timing of next trigger signal, thus controlling the interline transfer type solid-state imaging element so that one frame of image information is outputted every cycle of the trigger signal through the vertical transfer section;

storage means having a storage capacity to store plural frames of images and adapted for temporarily storing the image information outputted form the interline transfer type solid-state imaging element during plural cycles of the trigger signal;

read-out means for reading out the plural frames of image information stored in the storage means as one frame of output image information at a speed based on the standard vertical synchronizing signal and the standard horizontal synchronizing signal; and output means for appending the standard vertical synchronizing signal and the standard horizontal synchronizing signal of the standard television system to the one frame of output image information read out by the read-out means and outputting the resultant one frame of output image information.

10. The imaging device as claimed in claim 9, wherein the imaging element control means includes sub-synchronizing signal generating means for generating a sub-vertical synchronizing signal based on the trigger signal as a reference and outputting the sub-vertical synchronizing signal to the imaging device, and high-speed horizontal synchronizing signal generating means for generating a high-speed horizontal synchronizing signal having a frequency twice the frequency of the standard horizontal synchronizing signal during the first period and outputting the high-speed horizontal synchronizing signal to the imaging device.

11. The imaging device as claimed in claim 9, wherein the synchronizing signal generating means generates a standard vertical synchronizing signal and a standard horizontal synchronizing signal in conformity to the CCIR system.

12. A driving control method for an interline transfer type solid-state imaging element having a light-receiving section in which plural light-receiving elements, each generating and storing electric charges corresponding to the quantity of incident light, are arranged in a matrix, a vertical transfer section for transferring the electric charges read out from each of the light-receiving elements, and a horizontal transfer section for outputting the electric charges transferred through the vertical transfer section, the method comprising the steps of:

(a) generating a second trigger signal having a pulse width allowing variable setting by a user on the basis of a first trigger signal;

(b) eliminating all electric charges stored in the plural light-receiving elements as ineffective charges at a second timing based on the first timing which is the timing of the leading edge of the second trigger signal;

(c) reading out the electric charges stored in the plural light-receiving elements to the vertical transfer section at a third timing after a predetermined time from the second timing;

(d) vertically transferring the electric charges transferred to the vertical transfer section at a first transfer speed during a first period from the third timing to a fourth timing; and (e) vertically transferring the electric charges of the vertical transfer section at a second transfer speed which is lower than the first transfer speed during a second period from the fourth timing to a fifth timing based on the trailing edge of the second trigger signal, thus outputting the electric charges supplied to the horizontal transfer section during the second period, as effective charges from the horizontal transfer section.

13. The driving control method for an imaging element as claimed in claim 12, wherein the step (a) further includes a step of changing the pulse width of the second trigger signal by a user in order to change an image range to be outputted as the effective charges.

14. The driving control method for an imaging element as claimed in claim 12, wherein the second timing is the same as the first timing at the step (b).

15. An imaging device comprising:

an interline transfer type solid-state imaging element having a light-receiving section in which plural light-receiving elements, each generating and storing electric charges corresponding to the quantity of incident light, are arranged in a matrix, a vertical transfer section for transferring the electric charges read out from each of the light-receiving elements, and a horizontal transfer section for outputting the electric charges transferred through the vertical transfer section;

pulse width adjusting means for generating a second trigger signal having a pulse width allowing variable setting by a user on the basis of a first trigger signal; and imaging element control means for eliminating all electric charges stored in the plural light-receiving elements as ineffective charges at a second timing based on the first timing which is the timing of the leading edge of the second trigger signal, reading out the electric charges stored in the plural light-receiving elements to the vertical transfer section at a third timing after a predetermined time from the second timing, vertically transferring the electric charges transferred to the vertical transfer section at a first transfer speed during a first period from the third timing to a fourth timing, and vertically transferring the electric charges of the vertical transfer section at a second transfer speed which is lower than the first transfer speed during a second period from the fourth timing to a fifth timing based on the trailing edge of the second trigger signal, thus controlling the interline transfer type solid-state imaging element so that the electric charges supplied to the horizontal transfer section during the second period are outputted as effective charges from the horizontal transfer section.

16. The imaging device as claimed in claim 15, wherein imaging element control means includes standard synchronizing signal generating means for generating a standard vertical synchronizing signal and a standard horizontal synchronizing signal in conformity to the standard television system and outputting the standard horizontal synchronizing signal to the interline transfer type solid-state imaging element, sub-synchronizing signal generating means for generating a sub-vertical synchronizing signal providing a second timing based on the timing of the leading edge of the second trigger signal as a reference and outputting the sub-vertical synchronizing signal to the interline transfer type solid-state imaging element, and high-speed horizontal synchronizing signal generating means for generating a high-speed horizontal synchronizing signal having a higher frequency than the standard horizontal synchronizing signal during the first period and outputting the high-speed horizontal synchronizing signal to the interline transfer type solid-state imaging element.

17. The imaging device as claimed in claim 16, wherein the sub-synchronizing signal generating means generates a sub-vertical synchronizing signal providing a second timing which is the same as the first timing.

18. An imaging control device for controlling an imaging device having an interline transfer type solid-state imaging element and imaging means, the interline transfer type solid-state imaging element including a light-receiving section in which plural light-receiving elements, each generating and storing electric charges corresponding to the quantity of incident light, are arranged in a matrix, a vertical transfer section for transferring effective charges read out from each of the light-receiving elements, and a horizontal transfer section for outputting the effective charges transferred through the vertical transfer section, the imaging means being adapted for outputting an imaging signal based on the effective charges, the imaging control device comprising:
  pulse width adjusting means for generating a second trigger signal having a pulse width allowing variable setting by a user on the basis of a first trigger signal; and
  imaging element control means for eliminating all electric charges stored in the plural light-receiving elements as ineffective charges at a second timing based on the first timing which is the timing of the leading edge of the second trigger signal, reading out the electric charges stored in the plural light-receiving elements to the vertical transfer section at a third timing after a predetermined time from the second timing, vertically transferring the electric charges transferred to the vertical transfer section at a first transfer speed during a first period from the third timing to a fourth timing, and vertically transferring the electric charges of the vertical transfer section at a second transfer speed which is lower than the first transfer speed during a second period from the fourth timing to a fifth timing based on the trailing edge of the second trigger signal, thus controlling the interline transfer type solid-state imaging element so that the electric charges supplied to the horizontal transfer section during the second period are outputted as effective charges from the horizontal transfer section.

19. The imaging control device as claimed in claim 18, wherein the imaging element control means includes standard synchronizing signal generating means for generating a standard vertical synchronizing signal and a standard horizontal synchronizing signal in conformity to the standard television system and outputting the standard horizontal synchronizing signal to the imaging device, sub-synchronizing signal generating means for generating a sub-vertical synchronizing signal providing a second timing based on the timing of the leading edge of the second trigger signal as a reference and outputting the sub-vertical synchronizing signal to the imaging device, and high-speed horizontal synchronizing signal generating means for generating a high-speed horizontal synchronizing signal having a higher frequency than the standard horizontal synchronizing signal during the first period and outputting the high-speed horizontal synchronizing signal to the imaging device.

20. The imaging control device as claimed in claim 19, wherein the sub-synchronizing signal generating means generates a sub-vertical synchronizing signal providing a second timing which is the same as the first timing.

21. The imaging control device as claimed in claim 18, further comprising storage means for temporarily storing the imaging signal outputted from the imaging device, and output control means for causing the storage means to store the imaging signal in response to the second trigger signal and reading out and outputting the imaging signal stored in the storage means as a still picture signal.

22. An imaging system comprising an imaging device and an imaging control device,
  the imaging device comprising: an interline transfer type solid-state imaging element including a light-receiving section in which plural light-receiving elements, each generating and storing electric charges corresponding to the quantity of incident light, are arranged in a matrix, a vertical transfer section for transferring effective charges read out from each of the light-receiving elements, and a horizontal transfer section for outputting the effective charges transferred through the vertical transfer section; and imaging means for outputting an imaging signal based on the effective charges,
  the imaging control device comprising: pulse width adjusting means for generating a second trigger signal having a pulse width allowing variable setting by a user on the basis of a first trigger signal; and imaging element control means for eliminating all electric charges stored in the plural light-receiving elements as ineffective charges at a second timing based on the first timing which is the timing of the leading edge of the second trigger signal, reading out the electric charges stored in the plural light-receiving elements to the vertical transfer section at a third timing after a predetermined time from the second timing, vertically transferring the electric charges transferred to the vertical transfer section at a first transfer speed during a first period from the third timing to a fourth timing, and vertically transferring the electric charges of the vertical transfer section at a second transfer speed which is lower than the first transfer speed during a second period from the fourth timing to a fifth timing based on the trailing edge of the second trigger signal, thus controlling the interline transfer type solid-state imaging element so that the electric charges supplied to the horizontal transfer section during the second period are outputted as effective charges from the horizontal transfer section.

23. The imaging system as claimed in claim 22, wherein the imaging element control means includes standard synchronizing signal generating means for generating a standard vertical synchronizing signal and a standard horizontal synchronizing signal in conformity to the standard television system and outputting the standard horizontal synchronizing signal to the imaging device, sub-synchronizing signal generating means for generating a sub-vertical synchronizing signal providing a second timing based on the timing of the leading edge of the second trigger signal as a reference and outputting the sub-vertical synchronizing signal to the imaging device, and high-speed horizontal synchronizing signal generating means for generating a high-speed horizontal synchronizing signal having a higher frequency than the standard horizontal synchronizing signal during the first period and outputting the high-speed horizontal synchronizing signal to the imaging device.

24. The imaging system as claimed in claim 23, wherein the sub-synchronizing signal generating means generates a sub-vertical synchronizing signal providing a second timing which is the same as the first timing.

* * * * *